US012713161B2

(12) United States Patent
Park et al.

(10) Patent No.: US 12,713,161 B2
(45) Date of Patent: Aug. 18, 2026

(54) IMAGE SENSOR AND DRIVING METHOD THEREOF

(71) Applicant: SAMSUNG ELECTRONICS CO., LTD., Suwon-si (KR)

(72) Inventors: Seok-Yong Park, Suwon-si (KR); Myeonggyun Kye, Suwon-si (KR); Min-Sun Keel, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 18/959,035

(22) Filed: Nov. 25, 2024

(65) Prior Publication Data

US 2025/0317668 A1 Oct. 9, 2025

(30) Foreign Application Priority Data

Apr. 5, 2024 (KR) ........................ 10-2024-0046732

(51) Int. Cl.

| | |
|---|---|
| ***H04N 25/78*** | (2023.01) |
| ***H04N 25/42*** | (2023.01) |
| ***H04N 25/532*** | (2023.01) |
| ***H04N 25/60*** | (2023.01) |
| ***H04N 25/616*** | (2023.01) |
| ***H04N 25/706*** | (2023.01) |
| ***H04N 25/77*** | (2023.01) |

(52) U.S. Cl.
CPC ........... *H04N 25/78* (2023.01); *H04N 25/706* (2023.01); *H04N 25/77* (2023.01)

(58) Field of Classification Search
CPC ........ H04N 25/77; H04N 25/78; H04N 25/42; H04N 25/532; H04N 25/57; H04N 25/59; H04N 25/60; H04N 25/616; H04N 25/71; H04N 25/75
See application file for complete search history.

(56) References Cited

U.S. PATENT DOCUMENTS

| | | | | |
|---|---|---|---|---|
| 8,723,095 | B2 | 5/2014 | Solhusvik et al. | |
| 9,100,605 | B2 | 8/2015 | Raynor | |
| 9,753,460 | B1 | 9/2017 | Safarik | |
| 10,250,825 | B2 | 4/2019 | Sun | |
| 10,522,578 | B2 | 12/2019 | Hanzawa et al. | |
| 10,887,538 | B2 * | 1/2021 | Zhu | H04N 25/633 |

(Continued)

FOREIGN PATENT DOCUMENTS

| | | |
|---|---|---|
| JP | 6987033 | 12/2021 |

*Primary Examiner* — Marly S Camargo
(74) *Attorney, Agent, or Firm* — MORGAN, LEWIS & BOCKIUS LLP

(57) ABSTRACT

An image sensor according to an embodiment includes a pixel array that includes at least one active pixel configured to generate an active signal based on first light received from a light source, and at least one dummy pixel configured to generate a dummy signal based on the first light, a readout circuit configured to generate an image output signal based on an active signal output from a first active pixel of at least one active pixel, and generate a mode data signal related to ambient light entering the pixel array, based on a dummy signal output from a first dummy pixel of at least one dummy pixel, and a controller that determines whether to set an ambient light subtraction mode, based on the mode data signal, and controls the pixel array based on whether the ambient light subtraction mode has been set.

20 Claims, 19 Drawing Sheets

(56) References Cited

U.S. PATENT DOCUMENTS

| | | | | |
|---|---|---|---|---|
| 11,387,266 | B2 * | 7/2022 | Hanzawa | H10F 39/153 |
| 11,653,110 | B2 | 5/2023 | Lee et al. | |
| 11,898,848 | B2 | 2/2024 | Dooley et al. | |
| 2015/0208009 | A1 * | 7/2015 | Oh | H04N 25/77<br>348/302 |
| 2022/0214172 | A1 | 7/2022 | Dooley et al. | |
| 2023/0421926 | A1 * | 12/2023 | Park | H04N 25/78 |
| 2025/0097594 | A1 * | 3/2025 | Lee | H04N 25/42 |

* cited by examiner 100
213
211
231
241
243
245
210
CL1
240
RLn-1
RLn-2
230
RL1
DR1
DR2
DR3

300
301
303
305
VPIX
RX
RS
FD2
DCX
DCG
TS
TX
PD
FD1
SF1
NO12
PCX
PC
PSX2
PSEL2
C11
SMP11
SMPS11
PSEL11
PSX11
SMPS12
C12
SMP12
NO11
SF2
SX
SEL
VS1
CL

FIG. 5

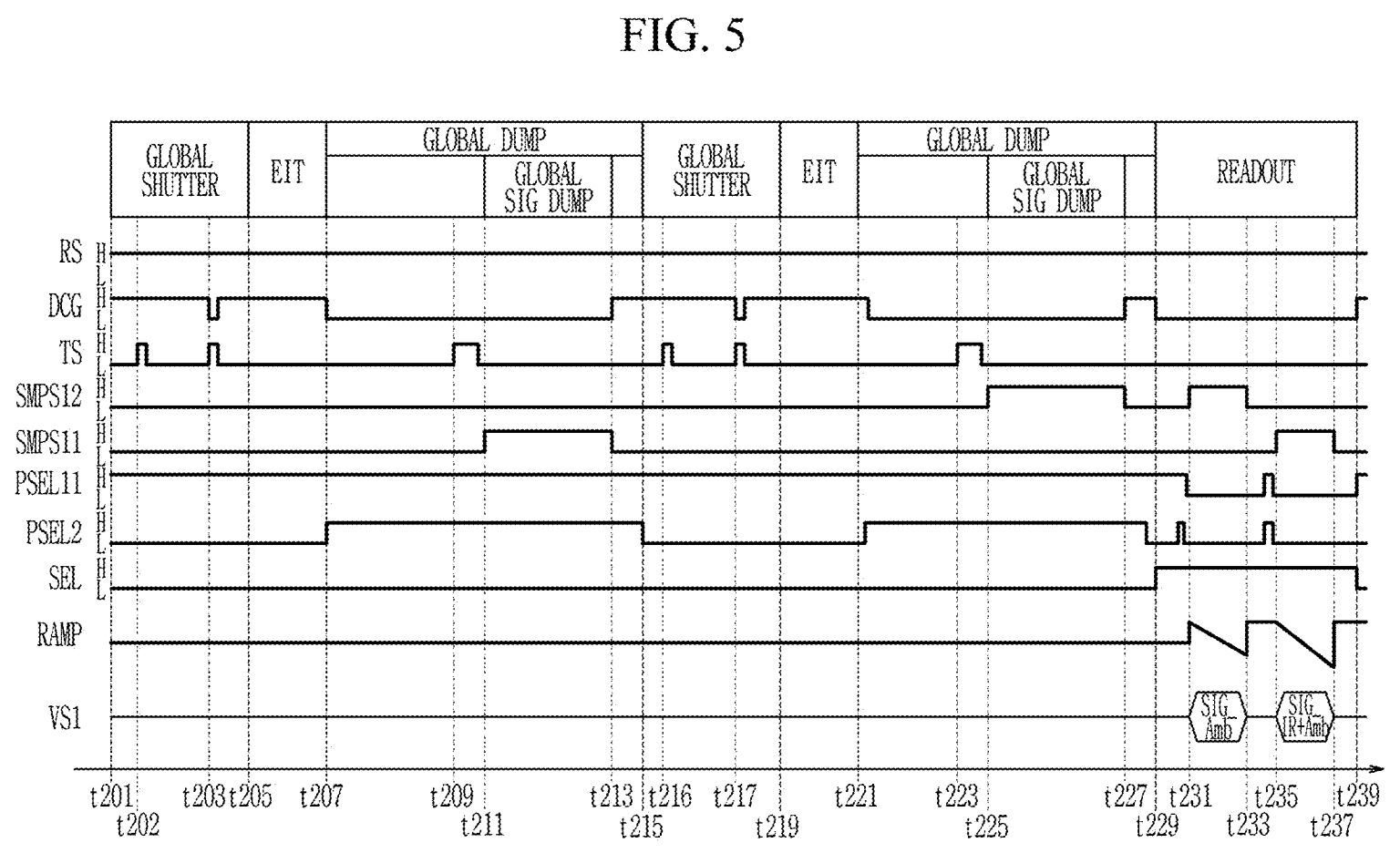

GLOBAL SHUTTER
EIT
GLOBAL DUMP
GLOBAL SIG DUMP
GLOBAL SHUTTER
EIT
GLOBAL DUMP
GLOBAL SIG DUMP
READOUT

RS
DCG
TS
SMPS12
SMPS11
PSEL11
PSEL2
SEL
RAMP
VS1

SIG_Amb
SIG_(IR+Amb)

t201 t202 t203 t205 t207 t209 t211 t213 t215 t216 t217 t219 t221 t223 t225 t227 t229 t231 t233 t235 t237 t239

1100
1101
1103
1105
VPIX
RS
RX
FD2
DCG
DCX
FD1
SF1
NO42
PC
PCX
PSEL2
PSX2
TS
TX
PD
SMPS41
SMP41
C41
PSEL41
PSX41
NO41
SMPS42
SMP42
C42
SMPS43
SMP43
C43
SMPS44
SMP44
C44
SF2
SEL
SX
VS4
CL 1400
1401
1403
1405
VPIX
RS
RX
FD2
DCG
DCX
FD1
TS
TX
PD
SF1
NO52
PC
PCX
PSEL2
PSX2
PSEL51
PSX51
NO51
SMPS51
SMP51
C51
SMPS52
SMP52
C52
SMPS53
SMP53
C53
SMPS54
SMP54
C54
SF2
SEL
SX
VS5
CL

GLOBAL SHUTTER
EIT
GLOBAL SIGNAL DUMP
GLOBAL RST DUMP
GLOBAL SIG DUMP
READOUT
RS
DCG
TS
SMPS53, SMPS54
SMPS33, SMPS34
SMPS31, SMPS32, SMPS51, SMPS52
PSEL31, PSEL51
PSEL2
SEL
RAMP
VS3
VS4
RST IR+Am
SIG IR+Am
RST
SIG IR+Am
t701 t702 t703 t705 t707 t709 t711 t713 t715 t717 t719 t721 t723 t725 t727

FIG. 19

1900
1910
ECU
ECU
Driving Unit
1940
CCU
1960
Input
1950
Storage
1920
Image Sensor
1930

IMAGE SENSOR AND DRIVING METHOD THEREOF

CROSS-REFERENCE TO RELATED APPLICATIONS

This application claims priority under 35 U.S.C. § 119 to Korean Patent Application No. 10-2024-0046732, filed on Apr. 5, 2024, the disclosure of which is incorporated by reference herein in its entirety.

TECHNICAL FIELD

Embodiments of the present disclosure relate to an image sensor and a driving method of the image sensor.

DISCUSSION OF RELATED ART

As systems for autonomous driving become more ubiquitous, advanced driver assistance systems (ADAS) functions are being applied to vehicles. ADAS are systems for vehicles that assist drivers in taking appropriate actions, or automatically controlling vehicles, based on external environment information detected by sensors and cameras, which can contribute to creating a safer driving environment. ADAS can provide safety and convenience for drivers, for example, by detecting the conditions of the drivers and alerting them.

SUMMARY

Embodiments of the present disclosure provide an image sensor with increased reliability, and provide a vehicle including an image sensor with increased reliability.

According to an embodiment, an image sensor includes a pixel array including an active pixel configured to generate an active signal based on first light received from a light source, and a dummy pixel configured to generate a dummy signal based on the first light. The image sensor further includes a readout circuit configured to generate an image output signal based on the active signal output from the active pixel, and generate a mode data signal related to ambient light entering the pixel array based on the dummy signal output from the dummy pixel. The image sensor further includes a controller configured to determine whether to set an ambient light subtraction mode, based on the mode data signal, and control the pixel array based on whether the ambient light subtraction mode has been set.

According to an embodiment, a driving method of an image sensor includes receiving, by an image sensor including an active pixel and a dummy pixel, incident light for a first frame. The method further includes generating, by the active pixel, an active signal based on the incident light. The method further includes generating an image output signal based on the active signal, and determining whether to set an ambient light subtraction mode, with respect to a next frame subsequent to the first frame, based on a dummy signal generated by the dummy pixel. The ambient light subtraction mode removes noise caused by ambient light of the incident light. The method further includes driving the image sensor according to whether the ambient light subtraction mode has been set.

According to an embodiment, a sensor system includes a light source and an image sensor configured to receive incident light including light output from the light source and ambient light. The image sensor includes an active pixel configured to generate an active signal based on the incident light and a dummy pixel configured to generate a dummy signal based on the incident light. The image sensor is further configured to generate an image output signal based on the active signal, and determine whether to set an ambient light subtraction mode in which noise generated by the ambient light is removed from the image output signal. The image sensor is further configured to generate a light source control signal that controls the light source based on whether the ambient light subtraction mode has been set.

BRIEF DESCRIPTION OF THE DRAWINGS

The above and other features of the present disclosure will become more apparent by describing in detail embodiments thereof with reference to the accompanying drawings.

FIG. 5 is a timing diagram illustrating an operation of the image sensor according to an embodiment.

FIG. 19 is a drawing illustrating a vehicle including an image sensor according to an embodiment.

DETAILED DESCRIPTION

Figure 1:
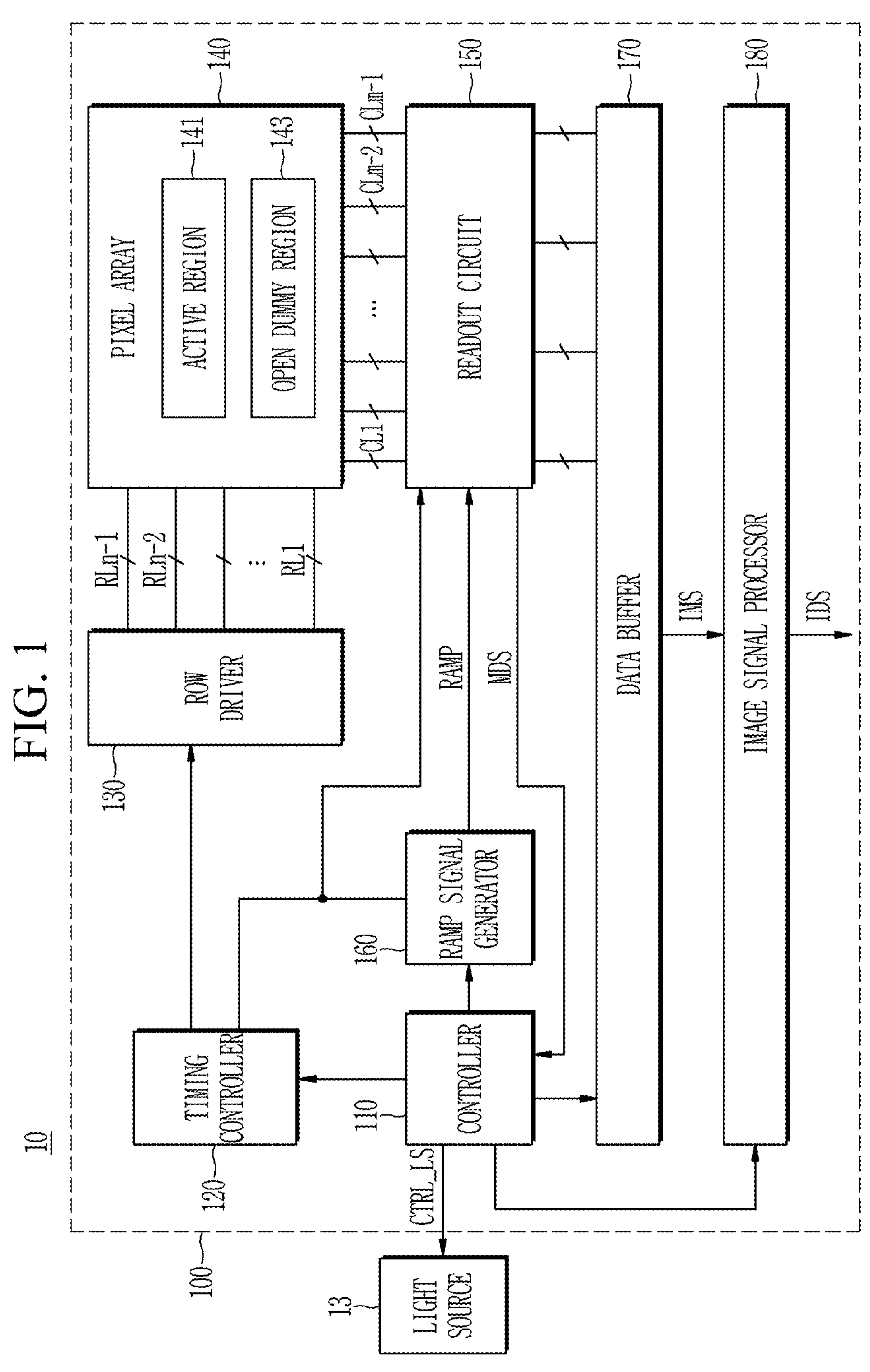
FIG. 1 is a block diagram illustrating a sensor system according to an embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms “a”, “an” and “the” are intended to include the plural forms as well, unless the context clearly indicates otherwise.

It will be understood that when a component such as a film, a region, a layer, etc., is referred to as being “on”, “connected to”, “coupled to”, or “adjacent to” another component, it can be directly on, connected, coupled, or adjacent to the other component, or intervening components may be present. It will also be understood that when a component is referred to as being “between” two components, it can be the only component between the two components, or one or more intervening components may also be present. Other words used to describe the relationships between components should be interpreted in a like fashion.

In the flowcharts described with reference to the drawings, the order of operations may be changed, and several operations may be combined, and an operation may be divided, and some operations may not be performed.

FIG. 1 is a block diagram illustrating a sensor system according to an embodiment.

A sensor system 10 may be mounted in an electronic device having an image or light sensing function. For example, the sensor system 10 may be mounted in an advanced driver assistance system (ADAS), a driver monitoring system (DMS) for observing the condition of a driver, or the like. For example, a DMS may track the face of the driver, the driving behavior of the driver, and the gaze of the driver. The sensor system 10 may be mounted in an electronic device which is incorporated as components in, for example, vehicles, furniture, manufacturing equipment, doors, various measuring devices, etc.

As shown in FIG. 1, the sensor system 10 may include a light source 13 and an image sensor 100.

The light source 13 may output light utilized for the image sensor 100 to sense images. For example, the light source 13 may output light with constant intensity for monitoring a driver. In some embodiments, the light source 13 may output an infrared ray IR.

The image sensor 100 may transmit a light source control signal CTRL_LS to the light source 13. The image sensor 100 may control the light source 13 through the light source control signal CTRL_LS such that the light source operates or does not operate. In some embodiments, the image sensor 100 may be exposed to constant illuminance by the light source 13.

The image sensor 100 may generate an image signal by converting light received from outside of the image sensor into an electrical signal. For example, the image sensor 100 may generate an image signal by monitoring a driver of a vehicle based on light received from the light source 13.

Frame periods of the image sensor 100 may be defined as times utilized to read reset voltages and pixel voltages from all of the pixels included in the pixel array 140. In some embodiments, one frame period may be equal to the product of the number of row lines RL and the horizontal period, or may be greater than the product of the number of row lines RL and the horizontal period. As the frame period of the image sensor shortens, the image sensor 100 may generate a larger number of image data items IDS for the same period of time. In one frame period, the image sensor 100 may generate one image data item IDS.

In some embodiments, the image sensor 100 may be driven in a global shutter mode. In the global shutter mode, the image sensor 100 may perform shutter operations that are performed during global shutter and effective integration time (EIT) sections, global signal dumping sections that are performed during global signal dumping sections, and readout operations that are performed during readout sections. Global shutter sections may be sections in which charges accumulated in floating diffusion nodes inside the pixels are reset. Effective integration time sections may be sections in which photoelectric devices are exposed to light, whereby photoelectric charges are generated. Global signal dumping sections may be sections in which sampling is performed to read out photoelectric charges generated during effective integration time sections. Readout sections may be sections in which photoelectric charges generated by the photoelectric devices are read out. For example, readout sections may be rolling readout sections in which readout operations are sequentially performed on a row-by-row basis from a first row RL1 to an (n−1)-th row RLn−1, where n is a positive integer. These rows may generally be referred to as rows RL.

Ambient light from outside of the sensor system 10 may enter the image sensor 100. For example, the image sensor 100 may receive ambient light from outside of the vehicle. When ambient light with high intensity enters, the image sensor 100 may generate a distorted image signal due to noise caused by the ambient light.

In some embodiments, the image sensor 100 may determine whether to set an ambient light subtraction mode (ASM) based on the intensity of ambient light. The ambient light subtraction mode may be a mode in which distortion of an image signal caused by a charge generated by ambient light is removed. For example, the image sensor 100 may set the ambient light subtraction mode when the intensity of the ambient light exceeds a preset value. In some embodiments, when the intensity of the ambient light is equal to or lower than the preset value, the image sensor 100 does not set the ambient light subtraction mode. The image sensor 100 may determine whether to set the ambient light subtraction mode based on the intensity of the ambient light measured from a first frame, and drive the next frame of the first frame based on whether the ambient light subtraction mode has been set.

As shown in FIG. 1, the image sensor 100 may include a controller 110, a timing controller 120, a row driver 130, a pixel array 140, a readout circuit 150, a ramp signal generator 160, a data buffer 170, and an image signal processor 180. Although it is shown in FIG. 1 that the image sensor 100 includes the image signal processor 180, embodiments of the present disclosure are not limited thereto. For example, in some embodiments, the image signal processor 180 may be disposed outside of the image sensor 100.

The controller 110 may control the operation of the light source 13 by the light source control signal CTRL_LS.

The controller 110 may control the individual constituent elements 120, 130, 140, 150, 160, 170, and 180 included in the image sensor 100. The controller 110 may control the operation timings of the individual constituent elements 120, 130, 140, 150, 160, 170, and 180, using control signals.

In some embodiments, the controller 110 may control the ramp signal generator 160 to adjust a reference signal RAMP that the ramp signal generator 160 generates. In some embodiments, the controller 110 may control the timing controller 120 to adjust the floating diffusion (FD) capacitance of pixel circuits inside the pixel array 140 through the row driver 130. In some embodiments, the controller 110 may control the timing controller 120 to adjust the operation timings of devices inside the pixel array 140 through the row driver 130.

In some embodiments, the controller 110 may determine whether to set the ASM. The controller 110 may control the individual constituent elements 120, 130, 140, 150, 160, 170, and 180 based on whether to set the ASM.

The timing controller 120 may generate a signal to become a reference for operation timings of components of the image sensor 100. The timing controller 120 may control timings of the row driver 130, the readout circuit 150, and the ramp signal generator 160. The timing controller 120 may provide control signals to control timings of the row driver 130, the readout circuit 150, and the ramp signal generator 160.

The timing controller 120 may control timings of devices inside the pixels in global shutter sections, effective integration time sections, global signal dumping sections, and readout sections.

The pixel array 140 may include a plurality of pixels, with a plurality of row lines (RL) connected to the pixels in one direction and a plurality of column lines (CL) connected to the pixels in the other direction, respectively.

In some embodiments, each pixel may include at least one photoelectric element (also referred to as optical sensing device). The photoelectric elements may detect incident light, and convert the incident light into electrical signals based on the amount of light, e.g., a plurality of analog pixel signals. The levels of analog pixel signals which are output from the photoelectric elements may increase as the amount of charges which are output from the photoelectric elements increase. In other words, the levels of analog pixel signals which are output from the photoelectric elements may increase as the amount of light entering the pixel array 140 increases.

The plurality of row lines RL (RL1 to RLn−1, where n is a positive integer) may extend in a first direction, and be connected to a plurality of pixels arranged along the first direction. For example, the plurality of row lines RL may transfer control signals output from the row driver 130 to devices provided in the pixels, for example, transistors. Signal lines other than the row lines RL may be arranged in the first direction. The plurality of column lines CL (CLI to CLm−1, where m is a positive integer) may extend in a second direction intersecting the first direction, and be connected to a plurality of pixels PX arranged along the second direction. The column lines CL may transfer pixel signals output from the plurality of pixels PX to the readout circuit 150.

The pixel array 140 may include an active region 141 and an open dummy region 143. The active region 141 may include a plurality of active pixels. The active pixels may sense light, and generate active signals according to the amount of the incident light. As will be described below, image output signals IMS may be generated based on the active signals generated by the active pixels.

The open dummy region 143 may include a plurality of dummy pixels. The dummy pixels may sense light and generate dummy signals based on the incident light.

The row driver 130 may generate a control signal that drives the pixel array 140, in response to a control signal from the timing controller 120, and provide the control signal to the plurality of pixels PX of the pixel array 140 through the plurality of row lines RL. In some embodiments, the row driver 130 may control the pixels PX in row line units, such that the pixels detect incident light. Each row line unit may include at least one row line RL.

The readout circuit 150 may convert pixel signals (or electrical signals) received from pixels PX coupled to a selected row line RL among the plurality of pixels PX, into pixel values indicating the amount of light, in response to a control signal from the timing controller 120. The readout circuit 150 may include, for example, a correlated double sampling (CDS) circuit and an analog-to-digital converter (ADC) circuit.

The correlated double sampling circuit may include a plurality of comparators, and the individual comparators may compare pixel signals, received from the pixel array 140 through the plurality of column lines CL, with the reference signal RAMP from the ramp signal generator 160. For example, a correlated double sampling circuit 151 may compare the received pixel signals with the reference signal RAMP and output the comparison results to the analog-to-digital converter circuit.

A plurality of pixel signals that is output from the plurality of pixels PX may have deviations due to unique characteristics of the individual pixels (for example, fixed pattern noise (FPN) and the like) and/or deviations due to differences in characteristics among pixel circuits that output pixel signals from the pixels PX (for example, transistors that output charge stored in photoelectric elements inside the pixels). Obtaining reset components (for example, reset signals) and sensing components (for example, sensing voltages) from the plurality of pixel signals output through the plurality of column lines CL and extracting the differences between them (for example, the differences between the reset voltages and the sensing voltages) as valid signal components in order to compensate for the deviations between the pixel signals is referred to as correlated double sampling. The correlated double sampling circuit may output comparison results obtained by applying the correlated double sampling technique to the received pixel signals.

The analog-to-digital (ADC) converter circuit may generate and output pixel values corresponding to the plurality of pixels on a row-by-row basis by converting the comparison results of the correlated double sampling circuit into digital data. The analog-to-digital converter circuit may include a plurality of counters (e.g., counter circuits). The counters may be implemented with up-counters that sequentially increase the count value based on a counting clock signal and operational circuits, with up/down counters, or with bit-wise inversion counters. The plurality of counters may be connected to the outputs of the plurality of comparators, respectively. Each of the plurality of counters may count comparison results that are output from a corresponding comparator, and output digital data (for example, a pixel value) according to the counting result.

In some embodiments, the readout circuit 150 may generate a mode data signal MDS based on dummy signals received from the pixel array 140. The mode data signal MDS may include data indicating the intensity of ambient light. For example, the mode data signal MDS includes pixel signals output from the dummy pixels. The readout circuit 150 may transmit the mode data signal MDS to the controller 110. The controller 110 may determine whether to set the ASM based on the mode data signal MDS. For example, the controller 110 may determine to set the ASM when the intensity of ambient light exceeds a preset threshold value. For example, the controller 110 may determine not to set the ASM when the intensity of ambient light is equal to or lower than the preset threshold value.

In some embodiments, the image sensor 100 may set the threshold value based on the intensity of light due to the light source 13 and ambient light and the level of noise which the image sensor 100 can sense.

In some embodiments, the readout circuit 150 may generate a mode data signal MDS based on the average value of dummy signals received from the pixel array 140 for at least one frame. For example, the readout circuit 150 may receive a plurality of pixel signals output from the dummy pixels for a predetermined number of frames, and generate a mode data signal MDS based on the average value of the plurality of pixel signals.

The ramp signal generator 160 may generate the reference signal RAMP and transmit the reference signal RAMP to the readout circuit 150. The ramp signal generator 160 may include, for example, current sources, resistors, and capacitors. The ramp signal generator 160 may adjust a ramp voltage, which is a voltage to be applied to a ramp resistor, by adjusting the current magnitude of a variable current source or the resistance value of a variable resistor. In this way, the ramp signal generator 160 may generate a plurality of ramp signals which fall or rise at slopes determined depending on the current magnitudes of variable current sources or the resistance values of variable resistors.

The data buffer 170 may store the pixel values of the plurality of pixels PX coupled to the selected column line CL received from the readout circuit 150. The data buffer 170 may output stored pixel values as image output signals IMS to the image signal processor 180 in response to an enable signal received from the controller 110.

The image signal processor 180 may perform image signal processing on the image output signals IMS received from the data buffer 170. For example, the image signal processor 180 may receive a plurality of image output signals IMS from the data buffer 170, and synthesize the received image output signals IMS to generate image data IDS.

Figure 2:
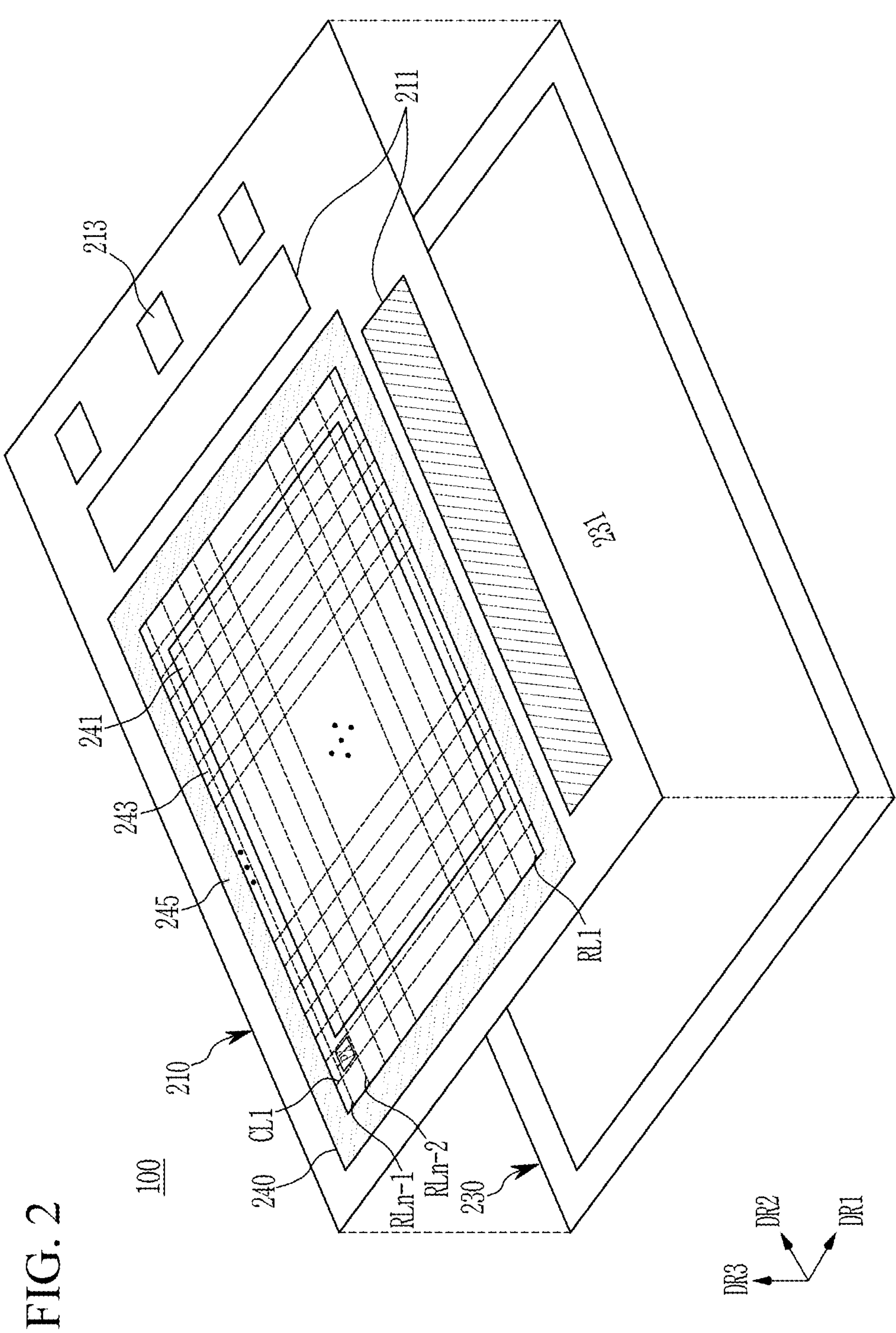
FIG. 2 is a drawing illustrating the conceptual layout of an image sensor according to an embodiment.

FIG. 2 is a drawing illustrating the conceptual layout of an image sensor according to an embodiment.

The image sensor 200 is a device that converts light received from outside of the image sensor 200 into an electrical signal. As shown in FIG. 2, the image sensor 200 may include a first layer 210 and a second layer 230 stacked on one another. The first layer 210 and the second layer 230 may be stacked in a third direction DR3. However, embodiments of the present disclosure are not limited thereto. For example, in some embodiments, the first layer 210 and the second layer 230 may be formed as one layer.

The first layer 210 may include a pixel array 240, a connection region 211, and a pad region 213.

The pixel array 240 may include a plurality of pixels PX arranged two-dimensionally (for example, in a matrix). Each of the plurality of pixels PX may generate a pixel signal.

The pixel array 240 may include a light-receiving region and a shaded region 245.

In some embodiments, the light-receiving region may include an active region 241 and an open dummy region 243. The active region 241 may include active pixels that receive light and generate pixel signals. Hereinafter, pixel signals that the active pixels generate will be referred to as active signals. The open dummy region 243 may include dummy pixels that receive light and generate pixel signals. Hereinafter, pixel signals that the dummy pixels generate will be referred to as dummy signals.

In some embodiments, the open dummy region 243 may be a partial region of the pixel array 240. For example, the open dummy region 243 may be disposed so as to surround the shaded region 245. For example, the open dummy region 243 may include at least one row line RL and at least one column line CL. In some embodiments, the size of the open dummy region 243 and the size of the active region 241 may be adjusted.

In some embodiments, the active pixels and the dummy pixels may include different structures.

In some embodiments, the shaded region 245 may be a region that is screened from light. In the shaded region 245, optical black pixels that are screened from light and generate optical black signals may be arranged. Although it is shown in FIG. 2 that the shaded region 245 is formed along the edge portion of the light-receiving region, embodiments of the present disclosure are not limited thereto. For example, in some embodiments, the shaded region 245 may be formed at an arbitrary position. In some embodiments, some regions of the shaded region 245 do not include photoelectric elements.

The connection region 211 may be disposed around the pixel array 240. For example, the connection region 211 may be disposed on one side of the pixel array 240. The connection region 211 may include a plurality of wiring lines. The connection region 211 may transmit and receive electrical signals to and from the pixel array 240 through the plurality of wiring lines.

The pad region 213 may be disposed around the pixel array 240. For example, the pad region 213 may be disposed adjacent to the edge of the image sensor 100. The pad region 213 may be connected to an external device. The pad region 213 may transmit and receive electrical signals to and from the external device.

Although it is shown in FIG. 2 that the connection region 211 is disposed between the pixel array 240 and the pad region 213, embodiments of the present disclosure are not limited thereto. For example, in some embodiments, the pixel array 240, the connection region 211, and the pad region 213 may be variously disposed.

The second layer 230 may be disposed below the first layer 210. The second layer 230 may include a logic circuit region 231. The second layer 230 may be electrically connected to the first layer 210. The logic circuit region 231 may be electrically connected to the pixel array 240 through the pad region 213 of the first layer 210.

The logic circuit region 231 may include a plurality of devices that drive the pixel array 240. For example, the logic circuit region 231 may include the controller 110, the timing controller 120, the ramp signal generator 160, the row driver 130, the readout circuit 150, etc., shown in FIG. 1.

Figure 3:
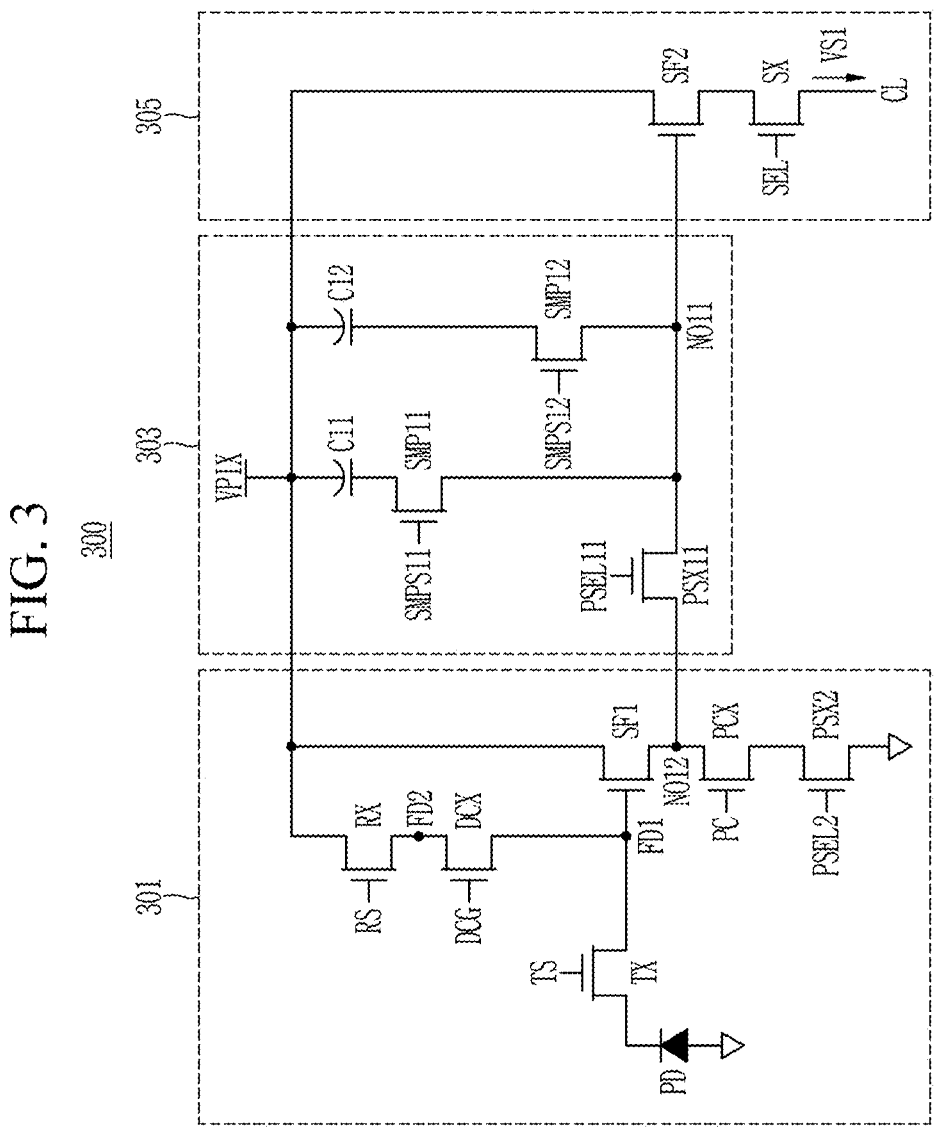
FIG. 3 is a circuit diagram illustrating a pixel according to an embodiment.

FIG. 3 is a circuit diagram illustrating a pixel according to an embodiment.

In some embodiments, pixels 300 may be the active pixels and the dummy pixels described above. Accordingly, a pixel signal VS1 that is output from a pixel 300 may be an active signal or a dummy signal.

Referring to FIG. 3, a pixel 300 may include a photoelectric-charge generating circuit 301, a sampling circuit 303, and a pixel signal circuit 305. Control signals TS, RS, DCG, PC, PSEL2, PSEL11, SMPS11, SMPS12, and SEL received from the row driver 130 may be applied to the pixel 300.

The photoelectric-charge generating circuit 301 may transmit photoelectric charge generated by a photoelectric element PD to the sampling circuit 303. For example, the photoelectric-charge generating circuit 301 may include the photoelectric element PD, a transfer transistor TX, a reset transistor RX, a gain control transistor DCX, a first drive transistor SF1, a precharge transistor PCX, and a second precharge select transistor PSX2.

The photoelectric element PD may generate photoelectric charge in proportion to the intensity of light. For example, the photoelectric element PD may include at least one of photodiodes, phototransistors, photogates, pinned photodiodes (PPDs), and combinations thereof, but is not limited thereto.

The transfer transistor TX may be connected between the photoelectric element PD and a first floating diffusion node FD1. A first terminal of the transfer transistor TX may be connected to the output terminal of the photoelectric element PD, and a second terminal of the transfer transistor TX may be connected to the first floating diffusion node FD1. The transfer transistor TX may be controlled by a transfer control signal TS. When the transfer transistor TX is turned on, charge generated by the photoelectric element PD may be transferred to the first floating diffusion node FD1.

The first floating diffusion node FD1 may receive the charge from the photoelectric element PD through the transfer transistor TX and accumulate the received charge. Parasitic capacitance may be formed at the first floating diffusion node FD1, or an actual capacitor element may be connected to the first floating diffusion node. According to the amount of change accumulated at the first floating diffusion node FD1, the potential of the gate electrode of the first drive transistor SF1 may vary.

The gain control transistor DCX may be connected between the first floating diffusion node FD1 and the reset transistor RX. A first terminal of the gain control transistor DCX may be connected to the first floating diffusion node FD1, and a second terminal of the gain control transistor DCX may be connected to a first terminal of the reset transistor RX. The gain control transistor DCX may be controlled by a gain control signal DCG. When the gain control transistor DCX is turned on, the gain control transistor DCX connects the first floating diffusion node FD1 and the second floating diffusion node FD2, which may increase the overall capacitance. As a result, the conversion gain—which is the rate at which charge is converted into voltage—may decrease. In other words, when the gain control transistor DCX is turned on, it may operate in a low conversion gain (LCG) mode. In contrast, when the gain control transistor DCX is turned off, it may operate in a high conversion gain (HCG) mode.

The reset transistor RX may be connected between a power voltage line that supplies a power voltage VPIX and the second floating diffusion node FD2. The power voltage VPIX may be applied to the first terminal of the reset transistor RX, and a second terminal of the reset transistor RX may be connected to the second floating diffusion node FD2. The reset transistor RX may be controlled by a reset control signal RS. When the reset transistor RX is turned on by the reset control signal RS, a predetermined electrical potential (for example, the power voltage VPIX) that is provided to the drain of the reset transistor RX may be transferred to the second floating diffusion node FD2. Accordingly, when the reset transistor RX is turned on, the photoelectric charge accumulated at the second floating diffusion node FD2 may be released, which may reset the second floating diffusion node FD2. If the gain control transistor DCX is turned on when the reset transistor RX is on, the photoelectric charge accumulated at the first floating diffusion node FD1 and the second floating diffusion node FD2 may be released, which may reset the first floating diffusion node FD1 and the second floating diffusion node FD2.

However, embodiments of the present disclosure are not limited thereto. For example, in some embodiments, the pixel 300 does not include the gain control transistor DCX. When the pixel does not include the gain control transistor DCX, the first floating diffusion node FD1 may be directly connected to one terminal of the reset transistor RX.

The gate of the first drive transistor SF1 may be connected to the first floating diffusion node FD1. The first drive transistor SF1 may act as a source follower buffer amplifier, which may buffer a signal according to the amount of charge accumulated at the first floating diffusion node FD1. The power voltage VPIX may be applied to a first terminal of the first drive transistor SF1, and a second terminal of the first drive transistor SF1 may be connected to a second output node NO12. The potential of the first floating diffusion node FD1 may vary according to the amount of change accumulated at the first floating diffusion node FD1, and as the potential of the first floating diffusion node FD1 varies, the first drive transistor SF1 may amplify the potential various at the first floating diffusion node FD1, and output the amplified result to the second output node NO12.

The precharge transistor PCX may be connected between the first drive transistor SF1 and the second precharge select transistor PSX2. A first terminal of the precharge transistor PCX may be connected to the second output node NO12, and a second terminal thereof may be connected to the second precharge select transistor PSX2. The precharge transistor PCX may be controlled by a precharge control signal PC. The precharge transistor PCX may precharge the second output node NO12 in response to the precharge control signal PC. In some embodiments, the precharge transistor PCX may precharge the second output node NO12 with a constant voltage based on the precharge control signal PC.

The second precharge select transistor PSX2 may be connected between the precharge transistor PCX and a ground voltage. A first terminal of the second precharge select transistor PSX2 may be connected to the second output node NO12, and the ground voltage may be applied to a second terminal of the second precharge select transistor PSX2. The second precharge select transistor PSX2 may be controlled by a second precharge select control signal PSEL2. The second precharge select transistor PSX2 may reset the second output node NO12 in response to the second precharge select control signal PSEL2. In other words, the first drive transistor SF1, the precharge transistor PCX, and the second precharge select transistor PSX2 may be connected in series.

The sampling circuit 303 may include a first precharge select transistor PSX11, a first sampling transistor SMP11, a second sampling transistor SMP12, a first capacitor C11, and a second capacitor C12.

The first precharge select transistor PSX11 may be connected between the second output node NO12 and a first output node NO11. The first precharge select transistor PSX11 may be controlled by a first precharge select control signal PSEL11. The first precharge select transistor PSX11 may reset the first output node NO11. The first output node NO11 may have parasitic capacitance.

The first sampling transistor SMP11 may be connected to the first output node NO11 and the first capacitor C11. A first terminal of the first sampling transistor SMP11 may be connected to the first output node NO11, and a second terminal of the first sampling transistor SMP11 may be connected to the first capacitor C11. The first sampling transistor SMP11 may be controlled by a first sampling control signal SMPS11. When the first sampling transistor SMP11 is turned on, the first capacitor C11 and the first output node NO11 may be connected, and sampling may be performed on the electrical signal of the first output node NO11.

The power voltage VPIX may be applied to a first terminal of the first capacitor C11, and a second terminal of the first capacitor C11 may be connected to the first sampling transistor SMP11. According to the switching operation of the first sampling transistor SMP11, charge may be accumulated in the first capacitor C11. In the first capacitor C11, charge corresponding to a signal buffered according to the amount of change accumulated at the first floating diffusion node FD1 may be accumulated. For example, in the first capacitor C11, charge corresponding to a signal buffered based on the photoelectric charge generated for an effective integration time section may be accumulated.

The second sampling transistor SMP12 may be connected to the first output node NO11 and the second capacitor C12. A first terminal of the second sampling transistor SMP12 may be connected to the first output node NO11, and a second terminal of the second sampling transistor SMP12 may be connected to the second trench CH2. The second sampling transistor SMP12 may be controlled by a second sampling control signal SMPS12. When the second sampling transistor SMP12 is turned on, the second capacitor C12 and the first output node NO11 may be connected, and sampling may be performed on the electrical signal of the first output node NO11.

The power voltage VPIX may be applied to a first terminal of the second capacitor C12, and a second terminal of the second capacitor C12 may be connected to the second sampling transistor SMP12. According to the switching operation of the second sampling transistor SMP12, charge may be accumulated in the second capacitor C12. In the second capacitor C12, charge corresponding to a signal buffered according to the amount of change accumulated at the first floating diffusion node FD1 may be accumulated. For example, in the second capacitor C12, charge corresponding to a signal buffered based on the amount of change of the first floating diffusion node FD1 reset in a global shutter section may be accumulated.

The pixel signal circuit 305 may include a second drive transistor SF2 and a selection transistor SX.

The gate of the second drive transistor SF2 may be connected to the first output node NO11. The second drive transistor SF2 may act as a source follower buffer amplifier, and may buffer a signal according to the amount of change accumulated at the first output node NO11. The power voltage VPIX may be applied to a first terminal of the second drive transistor SF2, and a second terminal of the second drive transistor SF2 may be connected to a first terminal of the selection transistor SX. The second drive transistor SF2 may amplify a potential variation at the first output node NO11, and output the potential variation to the first terminal of the selection transistor SX.

The first terminal of the selection transistor SX may be connected to the second drive transistor SF2, and the source terminals of the selection transistor SX may be connected to a column line CL. The selection transistor SX may be controlled by a selection control signal SEL. The row driver (reference symbol "130" in FIG. 1) may select unit pixels to be read out, on a row-by-row basis, through the selection control signal SEL. When the selection transistor SX is turned on, the pixel signal VS1 may be output to the column line CL. The column line CL may be one of the first to m-th column lines CLI to CLm-1 of FIG. 1. The pixel signal VS1 may include a reset signal corresponding to a reset operation, an image signal corresponding to a charge accumulation operation, etc.

In other words, the second drive transistor SF2 and the selection transistor SX may output the pixel signal VS1 according to the potential variation at the first output node NO11, to the column line CL. The pixel signal VS1 may be based on the potential at the first output node NO11 corresponding to one of the amount of charge stored in the first capacitor C11 and the amount of charge stored in the second capacitor C12.

Figure 4:
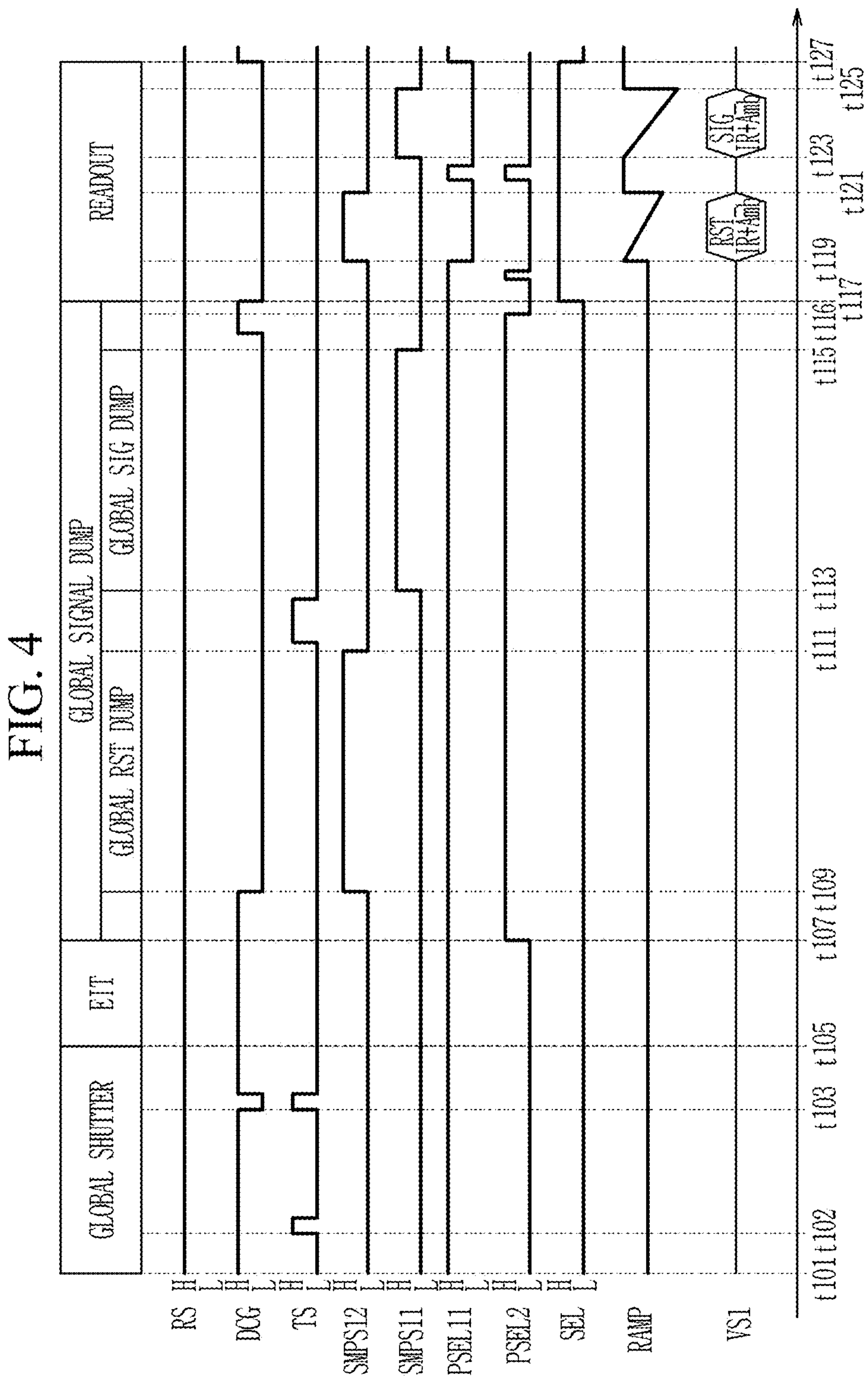
FIG. 4 is a timing diagram illustrating an operation of the image sensor according to an embodiment.

FIG. 4 is a timing diagram illustrating an operation of the image sensor according to an embodiment.

For example, FIG. 4 is a timing diagram illustrating an operation of the image sensor 100 including the pixel 300 according to FIG. 3. Also, FIG. 4 is a timing diagram illustrating when the image sensor 100 operates for one frame without setting the ASM.

In a global shutter section (GLOBAL SHUTTER) (from a time point t101 to a time point t105), the charge stored in the photoelectric element PD, the first floating diffusion node FD1, and the second floating diffusion node FD2 may be reset.

First, at the time point t101, the reset control signal RS, the gain control signal DCG, and the first precharge select control signal PSEL11 may have high levels H. Further, the transfer control signal TS, the first sampling control signal SMPS11, the second sampling control signal SMPS12, the second precharge select control signal PSEL2, and the selection control signal SEL may have low levels L.

Furthermore, at the time point t102, the transfer control signal TS may transition from the low level L to a high level H. When the transfer control signal TS is at the high level H, the transfer transistor TX may be turned on. As a result, the charge stored in the photoelectric element PD, the first floating diffusion node FD1, and the second floating diffusion node FD2 may be reset to the power voltage VPIX. Thereafter, the transfer control signal TS may transition from the high level H to the low level L.

At the time point t103, the transfer control signal TS may transition from the low level L to the high level H, and the gain control signal DCG may transition from the high level H to a low level L. When the transfer control signal TS is at the high level H, the transfer transistor TX may be turned on, and when the gain control signal DCG is at the low level L, the gain control transistor DCX may be turned off. As a result, the charge stored in the second floating diffusion node FD2 may be reset. Thereafter, the transfer control signal TS may transition from the high level H to the low level L, and the gain control signal DCG may transition from the low level L to the high level H.

An effective integration time (EIT) section (from the time point t105 to a time point t107) may be a section in which photoelectric charge is accumulated in the photoelectric element PD. The image sensor 100 may control the light source 13 by the light source control signal CTRL_LS such that the light source is turned on. For the effective integration time (EIT) section, the photoelectric element PD may generate photoelectric charge due to the light source (reference symbol "13" in FIG. 1) and ambient light.

For example, in the effective integration time (EIT) section, the reset control signal RS, the gain control signal DCG, and the first precharge select control signal PSEL11 may have high levels H. Further, the transfer control signal TS, the first sampling control signal SMPS11, the second sampling control signal SMPS12, the second precharge select control signal PSEL2, and the selection control signal SEL may have low levels L.

Although it is shown in FIG. 4 that the effective integration time (EIT) section is from the time point t105 to the time point t107, embodiments of the present disclosure are not limited thereto. For example, according to embodiments, the photoelectric element PD may generate photoelectric charge according to the intensity of incident light from when the transfer transistor TX is turned off after the time point t103 to a time point t111 when the transfer transistor TX is turned on.

The global signal dumping section (GLOBAL SIGNAL DUMP) (from the time point t107 to a time point t117) may be a section in which sampling is performed on the charge accumulated in the first floating diffusion node FD1.

First, at the time point t107, the second precharge select control signal PSEL2 may transition from the low level L to the high level H.

When the second precharge select control signal PSEL2 is at the high level H, the second precharge select transistor PSX2 may be turned on, and the first output node NO11 may be reset through the second precharge select transistor PSX2 and the precharge transistor PCX.

Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO12. When the first precharge select control signal PSEL11 is at the high level H, the first precharge select transistor PSX11 may be turned on. As a result, the reset voltage buffered at the second output node NO12 may be transferred to the first output node NO11.

For a global reset dumping section (GLOBAL RST DUMP) (from the time point t109 to the time point t111), sampling may be performed on the reset voltage.

First, at the time point t109, the gain control signal DCG may transition from the high level H to the low level L, and the second sampling control signal SMPS12 may transition from the low level L to the high level H.

When the gain control signal DCG is at the low level L, the gain control transistor DCX may be turned on, and when the second sampling control signal SMPS12 is at the high level H, the second sampling transistor SMP12 may be turned on. As a result, the second capacitor C12 may perform sampling on the signal of the first output node NO11. In other words, the second capacitor C12 may perform sampling on the reset voltage.

At the time point t111, the transfer control signal TS may transition from the low level L to the high level H, and the second sampling control signal SMPS12 may transition from the high level H to the low level L.

When the transfer control signal TS is at the high level H, the transfer transistor TX may be turned on. Photoelectric charge generated by the photoelectric element PD for the effective integration time (EIT) section may be transferred to the first floating diffusion node FD1. The first drive transistor SF1 may buffer an image voltage accumulated at the first floating diffusion node FD1, at the second output node NO12. Here, the image voltage may be a voltage generated at the first floating diffusion node FD1 by the photoelectric charge generated for the effective integration time (EIT) section. When the first precharge select control signal PSEL11 is at the high level H, the first precharge select transistor PSX11 may be turned on. As a result, the image voltage buffered at the second output node NO12 may be transferred to the first output node NO11.

For the global signal dumping section (GLOBAL SIG DUMP) (from the time point t113 to the time point t115), sampling may be performed on the image signal.

At the time point t113, the transfer control signal TS may transition from the high level H to the low level L, and the first sampling control signal SMPS11 may transition from the low level L to the high level H.

When the first sampling control signal SMPS11 is at the high level H, the first sampling transistor SMP11 may be turned on. As a result, the first capacitor C11 may perform sampling on the signal of the first output node NO11. In other words, the first capacitor C11 may perform sampling on the image voltage.

When the gain control signal DCG is the low level L, the gain control transistor DCX may be turned off, and when the second sampling control signal SMPS12 is at the high level H, the second sampling transistor SMP12 may be turned on. As a result, the second capacitor C12 may perform sampling on the signal of the first output node NO11. In other words, the second capacitor C12 may perform sampling on the reset voltage.

At the time point t115, the gain control signal DCG may transition from the low level L to the high level H, and the first sampling control signal SMPS11 may transition from the high level H to the low level L.

When the gain control signal DCG is at the high level H, the gain control transistor DCX may be turned on. Since the reset transistor RX has been turned on by the reset control signal RS at the high level H, the first floating diffusion node FD1 and the second floating diffusion node FD2 may be reset.

Thereafter, at the time point t116, the second precharge select control signal PSEL2 may transition from the high level H to the low level L.

A readout section (READOUT) (from the time point t117 to a time point t127) may be a section in which pixel signals are output from the pixel array 140. For example, the readout section (READOUT) (from the time point t117 to the time point t127) may be a section in which the pixel signal VS1 corresponding to the photoelectric charge generated by the pixel 300 is output.

First, at the time point t117, the gain control signal DCG may transition from the high level H to the low level L, and the selection control signal SEL may transition from the low level L to the high level H.

Thereafter, the second precharge select control signal PSEL2 may be output in a pulse form.

At the time point t119, the second sampling control signal SMPS12 may transition from the low level L to the high level H, and the first precharge select transistor PSX11 may transition from the high level H to the low level L.

At this time, when the second sampling control signal SMPS12 is at the high level H, the second sampling transistor SMP12 may be turned on. In the section in which the second sampling transistor SMP12 is maintained at the high level H, a reset signal RST_IR+Amb corresponding to the reset voltage sampled by the second capacitor C12 may be output as the pixel signal VS1 through the column line CL.

Meanwhile, while the second sampling control signal SMPS12 is maintained at the high level, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the reset signal RST_IR+Amb.

At the time point t121, the second sampling control signal SMPS12 may transition from the high level H to the low level L.

Thereafter, the first precharge select control signal PSEL11 and the second precharge select control signal PSEL2 may be output in pulse forms. While the first precharge select control signal PSEL11 and the second precharge select control signal PSEL2 are maintained at the high levels, the first output node NO11 may be reset.

At the time point t123, the first sampling control signal SMPS11 may transition from the low level L to the high level H.

When the first sampling control signal SMPS11 is at the high level H, the first sampling transistor SMP11 may be turned on. In the section in which the first sampling control signal SMPS11 is maintained at the high level H, an image signal SIG_IR+Amb corresponding to the image voltage sampled by the first capacitor C11 may be output as the pixel signal VS1 through the column line CL.

Meanwhile, while the first sampling control signal SMPS11 is maintained at the high level H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR+Amb.

At the time point t125, the first sampling control signal SMPS11 may transition from the high level H to the low level L.

Thereafter, at the time point t127, the selection control signal SEL may transition from the high level H to the low level L.

The readout circuit 150 may perform a correlated double sampling operation based on the result of the comparison between the reset signal RST_IR+Amb and the ramp signal RAMP and the result of the comparison between the image signal SIG_IR+Amb and the ramp signal RAMP received from the pixel array 240. Accordingly, the image sensor 100 may generate an image output signal IMS according to the photoelectric charge accumulated by the ambient light and the light source 13. The readout circuit 150 may generate a mode data signal MDS based on the difference between the image signal SIG_IR+Amb and the reset signal RST_IR+Amb. For example, the readout circuit 150 may generate a mode data signal MDS based on the result of the comparison between the image signal SIG_IR+Amb and the ramp signal RAMP and the result of the comparison between the reset signal RST_IR+Amb and the ramp signal RAMP.

Meanwhile, as described above, when ambient light with high intensity enters the image sensor, the image sensor 100 may generate a distorted image output signal IMS due to noise caused by the ambient light. When the controller 110 determines that the intensity of ambient light exceeds the preset threshold value based on the mode data signal MDS, the controller 110 may determine to set the ASM and control the image sensor 100 in the ASM for the next frame.

FIG. 5 is a timing diagram illustrating an operation of the image sensor according to an embodiment.

For example, FIG. 5 is a timing diagram illustrating an operation of the image sensor 100 including the pixel 300 according to FIG. 3. Also, FIG. 5 is a timing diagram illustrating when the image sensor 100 operates in the ASM for one frame.

In some embodiments, the image sensor 100 may perform at least one shutter operation. For example, the image sensor 100 may perform a first shutter operation in which a signal corresponding to photoelectric charge generated based on the intensity of the light source 13 and ambient light is obtained, and a second shutter operation in which a signal corresponding to photoelectric charge generated based on the intensity of ambient light while the light source 13 was not operating is obtained. Thereafter, the image sensor 100 may remove noise caused by the ambient light based on a pixel signal obtained through the first shutter operation and a pixel signal obtained through the second shutter operation.

A first global shutter section (GLOBAL SHUTTER) (from a time point t201 to a time point t205) is similar to the global shutter section (from the time point t101 to the time point t105) of FIG. 4, and therefore, the description of the global shutter section (from the time point t101 to the time point t105) of FIG. 4 may also be applied to the first global shutter section (from the time point t201 to the time point t205).

A first effective integration time (EIT) section (from the time point t205 to a time point t207) may be a section in which photoelectric charge is accumulated in the photoelectric element PD. The image sensor 100 may control the light source 13 by the light source control signal CTRL_LS such that the light source operators. For the first effective integration time (EIT) section, the photoelectric element PD may generate photoelectric charge due to the light source (reference symbol "13" in FIG. 1) and ambient light.

For example, in the first effective integration time (EIT) section, the reset control signal RS, the gain control signal DCG, and the first precharge select control signal PSEL11 may have high levels H. Further, the transfer control signal TS, the first sampling control signal SMPS11, the second sampling control signal SMPS12, the second precharge select control signal PSEL2, and the selection control signal SEL may have low levels L.

Although it is shown in FIG. 5 that the first effective integration time (EIT) section is from the time point t205 to the time point t207, embodiments of the present disclosure are not limited thereto. For example, in some embodiments, the photoelectric element PD may generate photoelectric charge according to the intensity of incident light from when the transfer transistor TX is turned off after the time point t203 to a time point t211 when the transfer transistor TX is turned on.

A first global signal dumping section (GLOBAL SIGNAL DUMP) (from the time point t207 to a time point t215) may be a section in which sampling is performed on the charge accumulated in the first floating diffusion node FD1.

First, at the time point t207, the second precharge select control signal PSEL2 may transition from the low level L to the high level H.

When the second precharge select control signal PSEL2 is at the high level H, the second precharge select transistor PSX2 may be turned on, and the first output node NO11 may be reset through the second precharge select transistor PSX2 and the precharge transistor PCX.

Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO12. When the first precharge select control signal PSEL11 is at the high level H, the first precharge select transistor PSX11 may be turned on. As a result, the reset voltage buffered at the second output node NO12 may be transferred to the first output node NO11.

At the time point t209, the transfer control signal TS may transition from the low level L to the high level H.

When the transfer control signal TS is at the high level H, the transfer transistor TX may be turned on. As a result, photoelectric charge generated for the first effective integration time (EIT) section may be transferred to the first floating diffusion node FD1. The first drive transistor SF1 may buffer an image voltage accumulated at the first floating diffusion node FD1, at the second output node NO12. By the first precharge select control signal PSEL11 at the high level H, the first precharge select transistor PSX11 may be turned on. As a result, the image voltage buffered at the second output node NO12 may be transferred to the first output node NO11. At this time, the image voltage may be a voltage generated based on the light source 13 and the ambient light.

At the time point t211, the transfer control signal TS may transition from the high level H to the low level L, and the first sampling control signal SMPS11 may transition from the low level L to the high level H.

When the first sampling control signal SMPS11 is at the high level H, the first sampling transistor SMP11 may be turned on. As a result, the first capacitor C11 may perform sampling on the signal of the first output node NO11. In other words, the first capacitor C11 may perform sampling on the image voltage caused by the light source 13 and the ambient light.

At the time point t213, the gain control signal DCG may transition from the low level L to the high level H, and the first sampling control signal SMPS11 may transition from the high level H to the low level L.

When the gain control signal DCG is at the high level H, the gain control transistor DCX may be turned on. Since the reset transistor RX has been turned on by the reset control signal RS at the high level H, the first floating diffusion node FD1 and the second floating diffusion node FD2 may be reset.

A second global shutter section (GLOBAL SHUTTER) (from a time point t215 to a time point t219) is similar to the global shutter section (from the time point t101 to the time point t105) of FIG. 4, and therefore, the description of the global shutter section (from the time point t101 to the time point t105) of FIG. 4 may also be applied to the second global shutter section (from the time point t215 to the time point t219).

A second effective integration time (EIT) section (from the time point t219 to a time point t221) may be a section in which photoelectric charge is accumulated in the photoelectric element PD. The image sensor 100 may control the light source 13 by the light source control signal CTRL_LS such that the light source does not operate. For the second effective integration time (EIT) section, the photoelectric element PD may generate photoelectric charge due to the ambient light.

For example, in the second effective integration time (EIT) section, the reset control signal RS, the gain control signal DCG, and the first precharge select control signal PSEL11 may have high levels H. Further, the transfer control signal TS, the first sampling control signal SMPS11, the second sampling control signal SMPS12, the second precharge select control signal PSEL2, and the selection control signal SEL may have low levels L.

Although it is shown in FIG. 5 that the second effective integration time (EIT) section is from the time point t219 to the time point t221, embodiments of the present disclosure are not limited thereto. For example, in some embodiments, the photoelectric element PD may generate photoelectric charge according to the intensity of incident light from when the transfer transistor TX is turned off after the time point t217 to a time point t223 when the transfer transistor TX is turned on.

A second global signal dumping section (GLOBAL SIGNAL DUMP) (from the time point t221 to a time point t229) may be a section in which sampling is performed on the charge accumulated in the first floating diffusion node FD1.

First, at the time point t221, the second precharge select control signal PSEL2 may transition from the low level L to the high level H.

When the second precharge select control signal PSEL2 is at the high level H, the second precharge select transistor PSX2 may be turned on, and the first output node NO11 may be reset through the second precharge select transistor PSX2 and the precharge transistor PCX.

Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO12. When the first precharge select control signal PSEL11 is at the high level H, the first precharge select transistor PSX11 may be turned on. As a result, the reset voltage buffered at the second output node NO12 may be transferred to the first output node NO11.

At the time point t223, the transfer control signal TS may transition from the low level L to the high level H.

When the transfer control signal TS is at the high level H, the transfer transistor TX may be turned on. As a result, photoelectric charge generated based on the ambient light by the photoelectric element PD for the second effective integration time (EIT) section may be transferred to the first floating diffusion node FD1. The first drive transistor SF1 may buffer an image voltage accumulated at the first floating diffusion node FD1, at the second output node NO12. When the first precharge select control signal PSEL11 is at the high level H, the first precharge select transistor PSX11 may be turned on. As a result, the image voltage buffered at the second output node NO12 may be transferred to the first output node NO11.

At the time point t225, the transfer control signal TS may transition from the high level H to the low level L, and the second sampling control signal SMPS12 may transition from the low level L to the high level H.

When the second sampling control signal SMPS12 is at the high level H, the second sampling transistor SMP12 may be turned on. As a result, the second capacitor C12 may perform sampling on the signal of the first output node NO11. As a result, the second capacitor C12 may perform sampling on the signal of the first output node NO11. In other words, the second capacitor C12 may perform sampling on the image voltage caused by the ambient light.

At the time point t227, the gain control signal DCG may transition from the high level H to the low level L, and the second sampling control signal SMPS12 may transition from the high level H to the low level L.

When the gain control signal DCG is at the high level H, the gain control transistor DCX may be turned on. Since the reset transistor RX has been reset by the reset control signal RS at the high level H, the first floating diffusion node FD1 and the second floating diffusion node FD2 may be reset.

Thereafter, the second precharge select control signal PSEL2 may transition from the high level H to the low level L.

A readout section (READOUT) (from the time point t229 to a time point t239) may be a section in which pixel signals are output from the pixel array 140. For example, the readout section (READOUT) (from the time point t229 to the time point t239) may be a section in which the pixel signal VS1 corresponding to the photoelectric charge generated by the pixel 300 is output.

First, at the time point t229, the gain control signal DCG may transition from the high level H to the low level L, and the selection control signal SEL may transition from the low level L to the high level H.

Thereafter, the second precharge select control signal PSEL2 may be output in a pulse form.

At the time point t231, the second sampling control signal SMPS12 may transition from the low level L to the high level H, and the first precharge select control signal PSEL11 may transition from the high level H to the low level L.

At this time, when the second sampling control signal SMPS12 is at the high level H, the second sampling transistor SMP12 may be turned on. In the section in which the second sampling control signal SMPS12 is maintained at the high level H, an image signal SIG_Amb corresponding to the image voltage sampled by the second capacitor C12 may be output through the column line CL. At this time, the image voltage sampled by the second capacitor C12 may be a voltage based on the photoelectric charge generated by the ambient light.

Meanwhile, while the second sampling control signal SMPS12 is maintained at the high level, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_Amb.

At the time point t233, the second sampling control signal SMPS12 may transition from the high level H to the low level L.

Thereafter, the first precharge select control signal PSEL11 and the second precharge select control signal PSEL2 may be output in pulse forms. While the first precharge select control signal PSEL11 and the second precharge select control signal PSEL2 are maintained at the high levels, the first output node NO11 may be reset.

At the time point t235, the first sampling control signal SMPS11 may transition from the low level L to the high level H.

When the first sampling control signal SMPS11 is at the high level H, the first sampling transistor SMP11 may be turned on. In the section in which the first sampling control signal SMPS11 is maintained at the high level H, an image signal SIG_IR_Amb corresponding to the image voltage sampled by the first capacitor C11 may be output through the column line CL. At this time, the image voltage sampled by the first capacitor C11 may be a voltage based on the photoelectric charge generated by the light source 13 and the ambient light.

Meanwhile, while the first sampling control signal SMPS11 is maintained at the high level H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR_Amb.

At the time point t237, the first sampling control signal SMPS11 may transition from the high level H to the low level L.

Thereafter, at the time point t239, the selection control signal SEL may transition from the high level H to the low level L.

The readout circuit 150 may perform a correlated double sampling operation based on the result of the comparison between the image signal SIG_Amb and the ramp signal RAMP and the result of the comparison between the image signal SIG_IR_Amb and the ramp signal RAMP received from the pixel array 240. Accordingly, the image sensor 100 may generate an image output signal IMS from which noise caused by the ambient light has been removed.

Meanwhile, since the readout circuit 150 cannot obtain the reset signal caused by the ambient light or a reset signal caused by the ambient light and the light source, the readout circuit 150 cannot obtain information on the intensity of the ambient light. Accordingly, the controller 110 cannot receive an appropriate mode data signal MDS from the readout circuit 150, and therefore, cannot determine whether to set the ASM.

Figure 6:
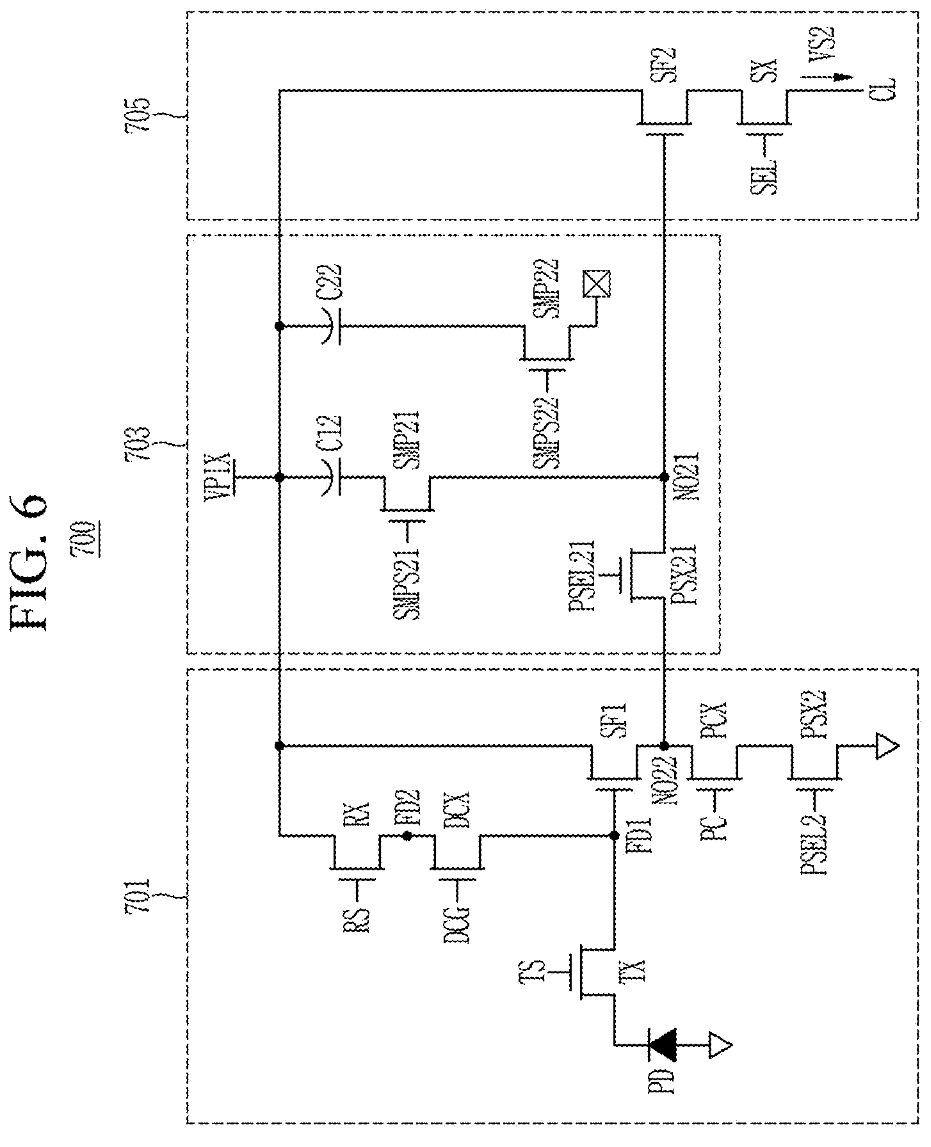
FIG. 6 is a circuit diagram illustrating a dummy pixel according to an embodiment.

FIG. 6 is a circuit diagram illustrating a dummy pixel according to an embodiment.

In some embodiments, a pixel 700 may be a dummy pixel according to an embodiment. Accordingly, a pixel signal VS2 that is output from the pixel 700 may be a dummy signal.

Referring to FIG. 6, a pixel 700 may include a photoelectric-charge generating circuit 701, a sampling circuit 703, and a pixel signal circuit 705. Control signals TS, RS, DCG, PC, PSEL2, PSEL21, SMPS21, SMPS22, and SEL received from the row driver 130 may be applied to the pixel 700.

The photoelectric-charge generating circuit 701, the sampling circuit 703, and the pixel signal circuit 705 may be similar to the photoelectric-charge generating circuit 301, the sampling circuit 303, and the pixel signal circuit 305 of the pixel 300 described with reference to FIG. 3, and there may be a difference only in the structure of a second sampling transistor SMP22.

For example, the second sampling transistor SMP22 may be connected to a second capacitor C22. A first terminal of the second sampling transistor SMP22 may become floating, and a second terminal of the second sampling transistor SMP22 may be connected to the second capacitor C22. The power voltage VPIX may be applied to a first terminal of the second capacitor C22, and a second terminal of the second capacitor C22 may be connected to the second sampling transistor SMP22.

Figure 7:
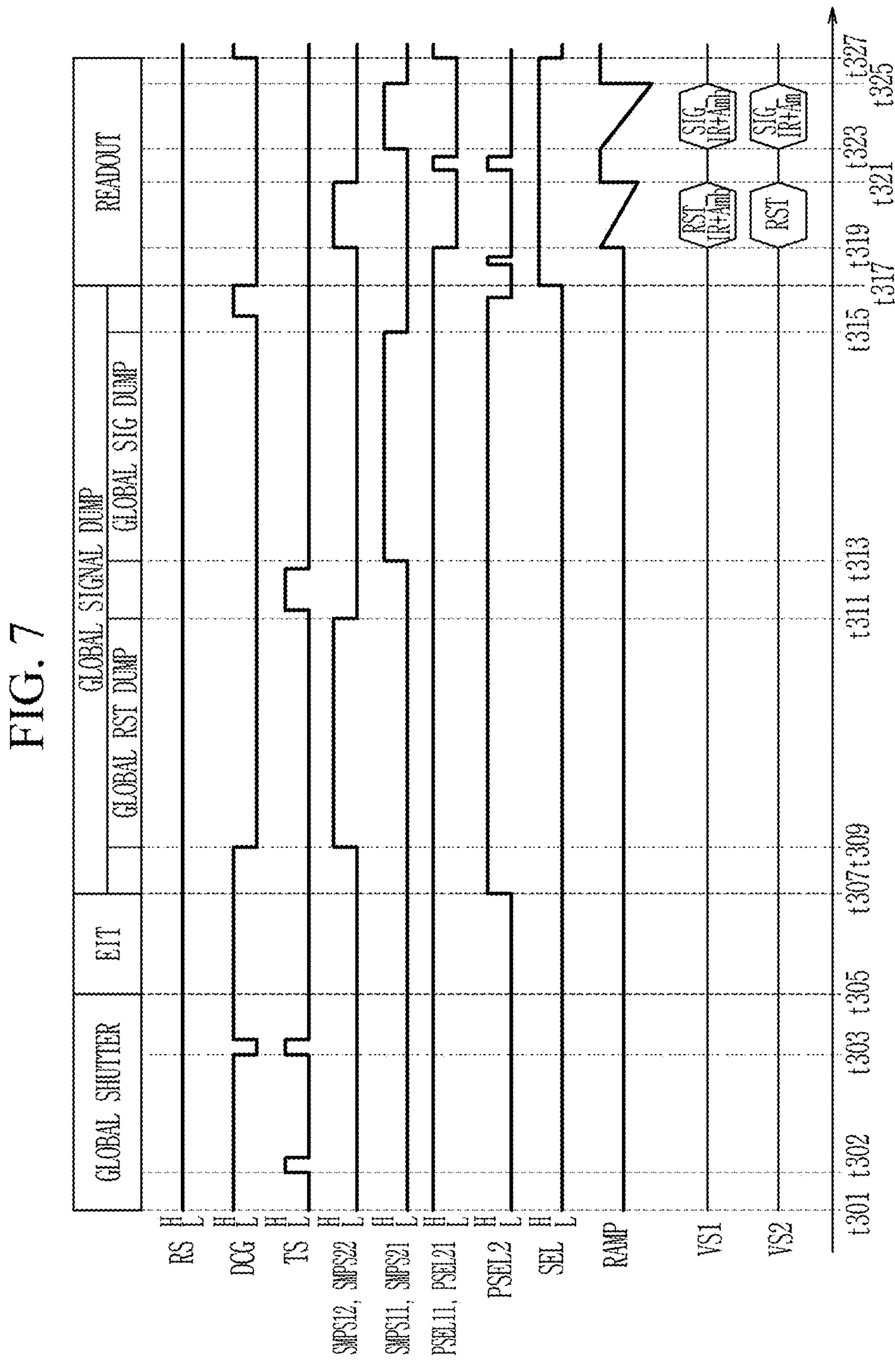
FIG. 7 is a timing diagram illustrating an operation of an image sensor according to an embodiment.

FIG. 7 is a timing diagram illustrating an operation of an image sensor according to an embodiment.

For example, FIG. 7 is a timing diagram illustrating an operation of an image sensor 100 including an active pixel according to the pixel 300 of FIG. 3 and a dummy pixel according to the pixel 700 of FIG. 6. Also, FIG. 7 is a timing diagram illustrating when the image sensor 100 operates for one frame without setting the ASM.

A global shutter section (GLOBAL SHUTTER) (from a time point t301 to a time point t305) is similar to the global shutter section (from the time point t101 to the time point t105) of FIG. 4, and therefore, the description of the global shutter section (from the time point t101 to the time point t105) of FIG. 4 may also be applied to the global shutter section (from the time point t301 to the time point t305).

An effective integration time (EIT) section (from the time point t305 to a time point t307) is similar to the effective integration time (EIT) section (from the time point t105 to the time point t107) of FIG. 4, and therefore, the description of the effective integration time section (from the time point t105 to the time point t107) of FIG. 4 may also be applied to the effective integration time section (from the time point t305 to the time point t307).

A global signal dumping section (GLOBAL SIGNAL DUMP) (from the time point t307 to a time point t317) is similar to the global signal dumping section (GLOBAL SIGNAL DUMP) (from the time point t107 to the time point t117) of FIG. 4, and therefore, the description of the global signal dumping section (from the time point t107 to the time point t117) of FIG. 4 may also be applied to the global signal dumping section (from the time point t307 to the time point t317).

In the pixel 700, since one end of the second sampling transistor SMP22 is floating, the electrical signal of the first output node NO21 cannot be sampled in the second capacitor C22 during the period from the time point t309 to the time point t311.

A readout section (READOUT) (from the time point t317 to a time point t327) may be a section in which pixel signals are output from the pixel array 140. For example, the readout section (from the time point t317 to the time point t327) may be a section in which the pixel signal VS1 corresponding to the photoelectric charge generated by the pixel 300 and the pixel signal VS2 corresponding to the photoelectric charge generated by the pixel 700 are output. At this time, the pixel signal VS1 may be an active signal, and the pixel signal VS2 may be a dummy signal.

First, at the time point t317, the gain control signal DCG may transition from the high level H to the low level L, and the selection control signal SEL may transition from the low level L to the high level H.

Thereafter, the second precharge select control signal PSEL2 may be output in a pulse form.

At the time point t319, the second sampling control signal SMPS12 and a second sampling control signal SMPS22 may transition from the low levels L to the high levels H, and the first precharge select control signal PSEL11 may transition from the high level H to the low level L.

At this time, when the second sampling control signal SMPS12 is at the high level H, the second sampling transistor SMP12 may be turned on. In the section in which the second sampling control signal SMPS12 is maintained at the high level H, a reset signal RST_IR+Amb corresponding to the reset voltage sampled by the second capacitor C12 may be output as the pixel signal VS1 through the column line CL.

When the second sampling control signal SMPS22 is at the high level H, the second sampling transistor SMP22 may be turned on. As a result, one end of the second capacitor C22 may become floating. A signal RST corresponding to the charge of a first output node NO21 may be output as the pixel signal VS2 through the column line CL.

Meanwhile, while the second sampling control signal SMPS12 and the second sampling control signal SMPS22 are maintained at the high levels, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the reset signal RST_IR+Amb and compare the ramp signal RAMP and the signal RST.

At the time point t321, the second sampling control signal SMPS12 may transition from the high level H to the low level L.

Thereafter, the first precharge select control signal PSEL11 and the second precharge select control signal PSEL2 may be output in pulse forms. While the first precharge select control signal PSEL11 and the second precharge select control signal PSEL2 are maintained at the high levels H, the first output node NO11 and the first output node NO21 may be reset.

At the time point t323, the first sampling control signal SMPS11 and a first sampling control signal SMPS21 may transition from the low levels L to the high levels H.

When the first sampling control signal SMPS11 is at the high level H, the first sampling transistor SMP11 may be turned on. In the section in which the first sampling control signal SMPS11 is maintained at the high level H, an image signal SIG_IR+Amb corresponding to the image voltage sampled by the first capacitor C11 may be output as the pixel signal VS1 through the column line CL.

Further, when the first sampling control signal SMPS21 is at the high level H, a first sampling transistor SMP21 may be turned on. In the section in which the first sampling control signal SMPS21 is maintained at the high level H, an image signal SIG_IR+Amb corresponding to an image voltage sampled by a first capacitor C21 may be output as the pixel signal VS2 through the column line CL.

Meanwhile, while the first sampling control signal SMPS11 and the first sampling control signal SMPS21 are maintained at the high levels H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR+Amb.

At the time point t325, the first sampling control signal SMPS11 may transition from the high level H to the low level L.

Thereafter, at the time point t327, the selection control signal SEL may transition from the high level H to the low level L.

The readout circuit 150 may perform a correlated double sampling operation based on the result of the comparison between the reset signal RST_IR+Amb of the pixel signal VS1 and the ramp signal RAMP and the result of the comparison between the image signal SIG_IR+Amb and the ramp signal RAMP received from the pixel 300. Accordingly, the image sensor 100 may generate an image output signal IMS according to the photoelectric charge accumulated by the ambient light and the light source 13.

The readout circuit 150 may perform a correlated double sampling operation based on the result of the comparison between the signal RST of the pixel signal VS2 received from the pixel 700 and the ramp signal RAMP and the result of the comparison between the image signal SIG_IR+Amb and the ramp signal RAMP. The readout circuit 150 may generate a mode data signal MDS based on the difference between the signal RST and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

Figure 8:
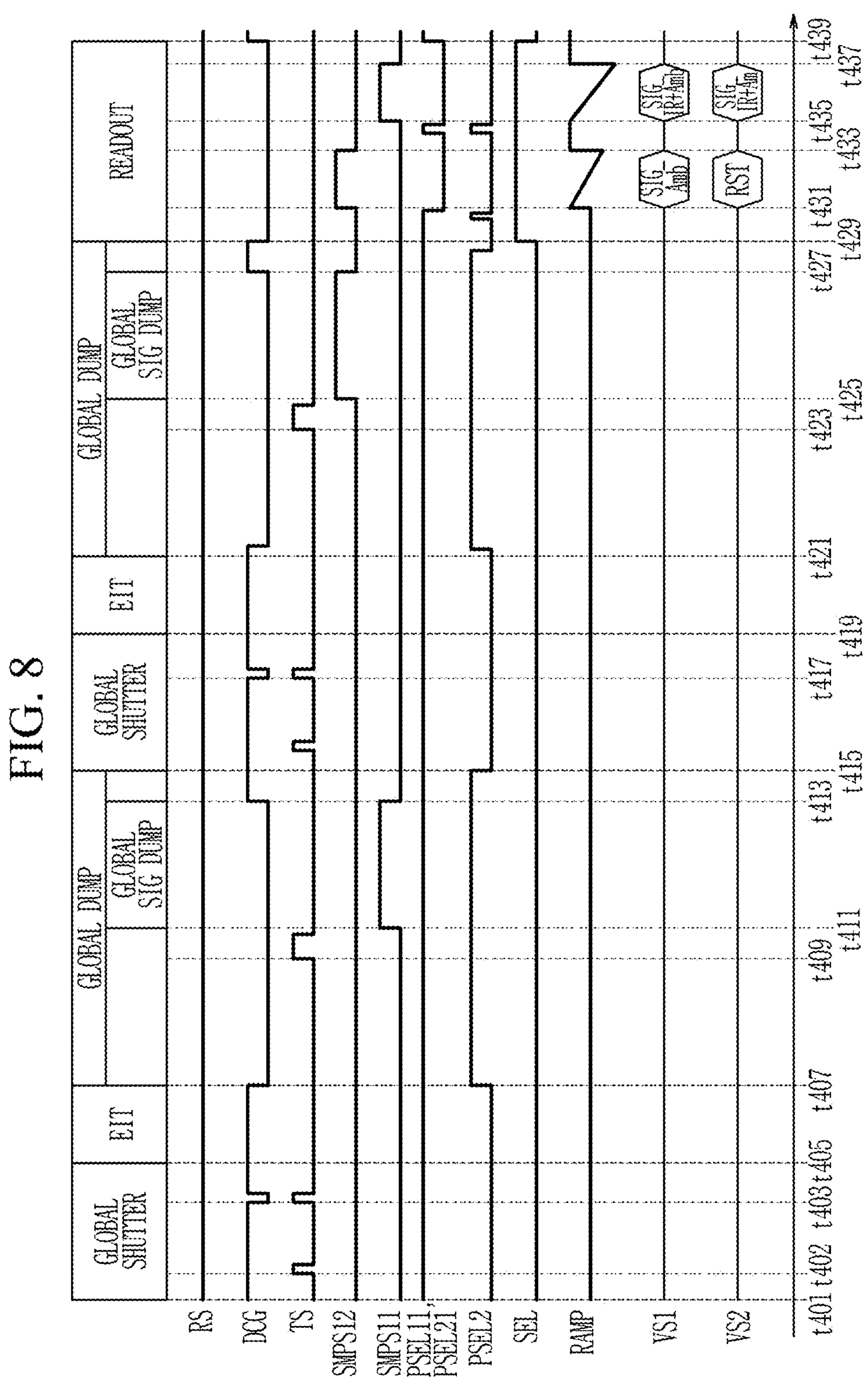
FIG. 8 is a timing diagram illustrating an operation of the image sensor according to an embodiment.

FIG. 8 is a timing diagram illustrating an operation of the image sensor according to an embodiment.

For example, FIG. 8 is a timing diagram illustrating an operation of an image sensor 100 including an active pixel according to the pixel 300 of FIG. 3 and a dummy pixel according to the pixel 700 of FIG. 6. Also, FIG. 8 is a timing diagram illustrating when the image sensor 100 operates in the ASM for one frame.

A first global shutter section (GLOBAL SHUTTER) (from a time point t401 to a time point t405), a first effective integration time (EIT) section (from a time point t407 a time point t407), a first global signal dumping section (GLOBAL SIGNAL DUMP) (from the time point t407 to a time point t415), a second global shutter section (GLOBAL SHUTTER) (from the time point t415 to a time point t419), a second effective integration time (EIT) section (from the time point t419 to a time point t421), and a second global signal dumping section (GLOBAL SIGNAL DUMP) (from the time point t421 to a time point t429) are similar to the first global shutter section (from the time point t201 to the time point t205) to the second global signal dumping section (from the time point t221 to the time point t229) shown in FIG. 5, and therefore, the description of the first global shutter section (from the time point t201 to the time point t205) to the second global signal dumping section (from the time point t221 to the time point t229) shown in FIG. 5 may be applied.

A readout section (READOUT) (from the time point t429 to a time point t439) may be a section in which pixel signals are output from the pixel array 140. For example, the readout section (from the time point t429 to the time point t439) may be a section in which the pixel signal VS1 corresponding to the photoelectric charge generated by the pixel 300 and the pixel signal VS2 corresponding to the photoelectric charge generated by the pixel 700 are output. At this time, the pixel signal VS1 may be an active signal, and the pixel signal VS2 may be a dummy signal.

First, at the time point t429, the gain control signal DCG may transition from the high level H to the low level L, and the selection control signal SEL may transition from the low level L to the high level H.

Thereafter, the second precharge select control signal PSEL2 may be output in a pulse form.

At the time point t431, the second sampling control signal SMPS12 may transition from the low level L to the high level H, and the first precharge select control signal PSEL11 may transition from the high level H to the low level L.

At this time, when the second sampling control signal SMPS12 is at the high level H, the second sampling transistor SMP12 may be turned on. In the section in which the second sampling control signal SMPS12 is maintained at the high level H, an image signal SIG_Amb corresponding to the image voltage sampled by the second capacitor C12 may be output as the pixel signal VS1 through the column line CL.

When the second sampling control signal SMPS22 is at the high level H, the second sampling transistor SMP22 may be turned on. As a result, one end of the second capacitor C22 may become floating. A signal RST corresponding to the charge of a first output node NO21 may be output as the pixel signal VS2 through the column line CL.

Meanwhile, while the second sampling control signal SMPS12 is maintained at the high level, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_Amb and compare the ramp signal RAMP and the signal RST.

At the time point t433, the second sampling control signal SMPS12 may transition from the high level H to the low level L.

Thereafter, the first precharge select control signal PSEL11 and the second precharge select control signal PSEL2 may be output in pulse forms. While the first precharge select control signal PSEL11 and the second precharge select control signal PSEL2 are maintained at the high levels H, the first output node NO11 and the first output node NO21 may be reset.

At the time point t435, the first sampling control signal SMPS11 may transition from the low level L to the high level H.

When the first sampling control signal SMPS11 is at the high level H, the first sampling transistor SMP11 may be turned on. In the section in which the first sampling control signal SMPS11 is maintained at the high level H, an image signal SIG_IR+Amb corresponding to the image voltage sampled by the first capacitor C11 may be output as the pixel signal VS1 through the column line CL.

Further, when the first sampling control signal SMPS21 at the high level H, a first sampling transistor SMP21 may be turned on. In the section in which the first sampling control signal SMPS21 is maintained at the high level H, an image signal SIG_IR+Amb corresponding to the charge according to the accumulation operation, sampled by a first capacitor C21, may be output as the pixel signal VS2 through the column line CL. Meanwhile, while the first sampling control signal SMPS11 is maintained at the high level H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR_Amb.

At the time point t437, the first sampling control signal SMPS11 may transition from the high level H to the low level L.

Thereafter, at the time point t439, the selection control signal SEL may transition from the high level H to the low level L.

The readout circuit 150 may perform a correlated double sampling operation based on the result of the comparison between the image signal SIG_Amb of the pixel signal VS1 received from the pixel 300 and the ramp signal RAMP and the result of the comparison between the image signal SIG_IR_Amb and the ramp signal RAMP. Accordingly, the image sensor 100 may generate an image output signal IMS from which noise caused by the ambient light has been removed.

Also, the readout circuit 150 may perform a correlated double sampling operation based on the result of the comparison between the signal RST of the pixel signal VS2 received from the pixel 700 and the ramp signal RAMP and the result of the comparison between the image signal SIG_IR+Amb and the ramp signal RAMP. The readout circuit 150 may generate a mode data signal MDS based on the difference between the signal RST and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

Figure 9:
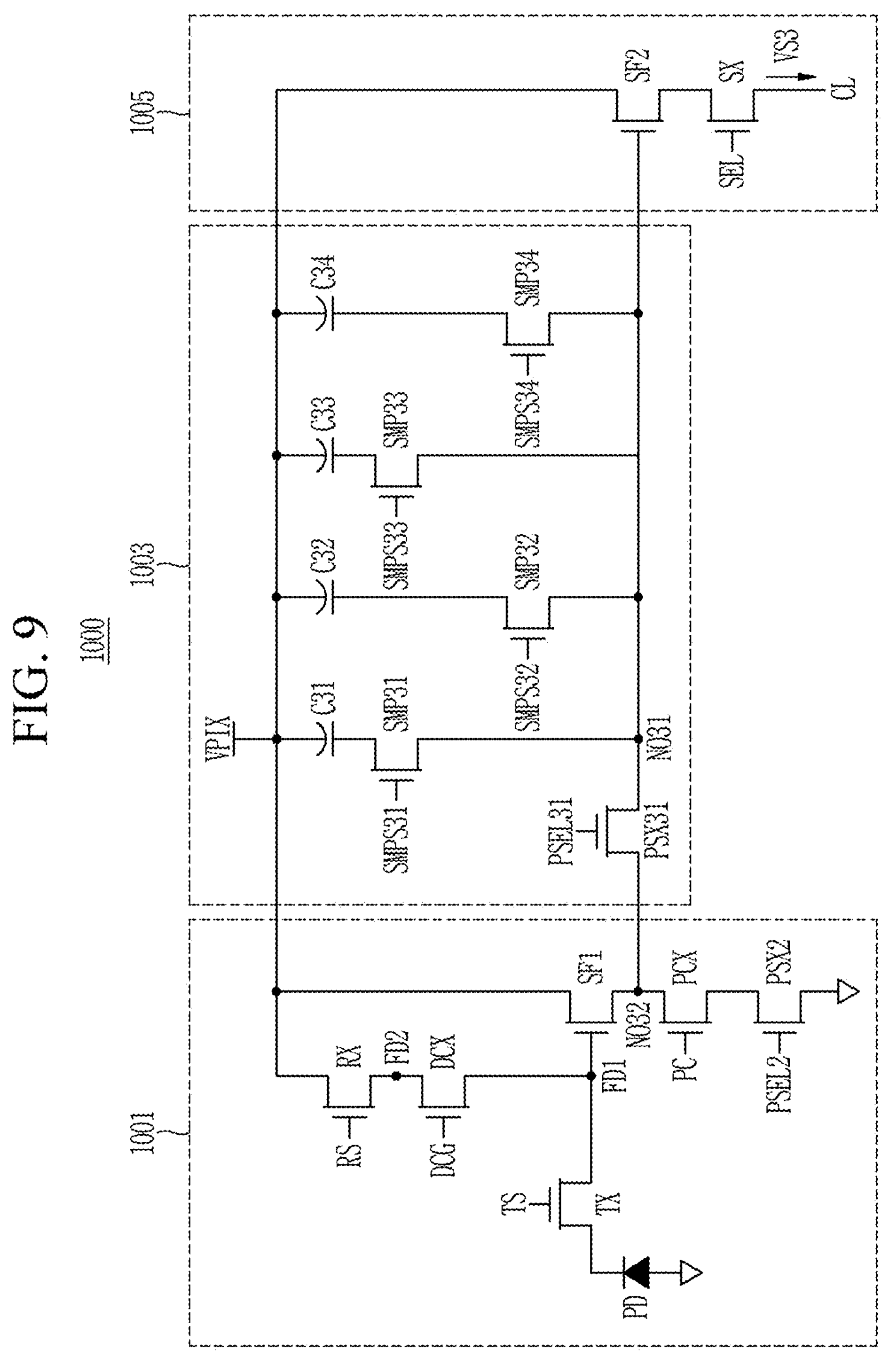
FIG. 9 is a circuit diagram illustrating a pixel according to an embodiment.

FIG. 9 is a circuit diagram illustrating a pixel according to an embodiment.

In some embodiments, a pixel 1000 may be an active pixel according to an embodiment. Accordingly, a pixel signal VS3 that is output from the pixel 1000 may be an active signal.

Referring to FIG. 9, a pixel 1000 may include a photoelectric-charge generating circuit 1001, a sampling circuit 1003, and a pixel signal circuit 1005. Control signals TS, RS, DCG, PC, PSEL31, PSEL2, SMPS31, SMPS32, SMPS33, SMPS34, and SEL received from the row driver 130 may be applied to the pixel 1000.

The photoelectric-charge generating circuit 1001 may transmit photoelectric charge generated by a photoelectric element PD to the sampling circuit 1003.

The photoelectric-charge generating circuit 1001 of FIG. 9 is similar to the photoelectric-charge generating circuit 301 of FIG. 3, and therefore, the description of the photoelectric-charge generating circuit 301 of FIG. 3 may also be applied to the photoelectric-charge generating circuit 1001 of FIG. 9.

The sampling circuit 1003 may include a first precharge select transistor PSX31, a first sampling transistor SMP31, a second sampling transistor SMP32, a third sampling transistor SMP33, a fourth sampling transistor SMP34, a first capacitor C31, a second capacitor C32, a third capacitor C33, and a fourth capacitor C34. In some embodiments, the capacitance of each of the first capacitor C31, the second capacitor C32, the third capacitor C33, and the fourth capacitor C34 may be determined in advance based on the amount of photoelectric charge to be generated by the photoelectric element PD.

The first precharge select transistor PSX31 may be connected between a second output node NO32 and a first output node NO31. The first precharge select transistor PSX31 may be controlled by a first precharge select control signal PSEL31. The first precharge select transistor PSX31 may reset the first output node NO31. The first output node NO31 may have parasitic capacitance.

The first sampling transistor SMP31 may be connected to the first output node NO31 and the first capacitor C31. A first terminal of the first sampling transistor SMP31 may be connected to the first output node NO31, and a second terminal of the first sampling transistor SMP31 may be connected to the first capacitor C31. The first sampling transistor SMP31 may be controlled by a first sampling control signal SMPS31. When the first sampling transistor SMP31 is turned on, the first capacitor C31 and the first output node NO31 may be connected, and sampling may be performed on the electrical signal of the first output node NO31.

The power voltage VPIX may be applied to a first terminal of the first capacitor C31, and a second terminal of the first capacitor C31 may be connected to the first sampling transistor SMP31. According to the switching operation of the first sampling transistor SMP31, charge may be accumulated in the first capacitor C31. For example, in the first capacitor C31, charge accumulated at a first floating diffusion node FD1 by a photoelectric-charge accumulation operation may be accumulated.

The second sampling transistor SMP32 may be connected to the first output node NO31 and the second capacitor C32. A first terminal of the second sampling transistor SMP32 may be connected to the first output node NO31, and a second terminal of the second sampling transistor SMP32 may be connected to the second capacitor C32. The second sampling transistor SMP32 may be controlled by a second sampling control signal SMPS32. When the second sampling transistor SMP32 is turned on, the second capacitor C32 and the first output node NO31 may be connected, and sampling may be performed on the electrical signal of the first output node NO31.

The power voltage VPIX may be applied to a first terminal of the second capacitor C32, and a second terminal of the second capacitor C32 may be connected to the second sampling transistor SMP32. According to the switching operation of the second sampling transistor SMP32, charge may be accumulated in the second capacitor C32. For example, in the second capacitor C32, charge accumulated at a first floating diffusion node FD1 by a photoelectric-charge accumulation operation may be accumulated.

The third sampling transistor SMP33 may be connected to the first output node NO31 and the third capacitor C33. A first terminal of the third sampling transistor SMP33 may be connected to the first output node NO31, and a second terminal of the third sampling transistor SMP33 may be connected to the third capacitor C33. The third sampling transistor SMP33 may be controlled by a third sampling control signal SMPS33. When the third sampling transistor SMP33 is turned on, the third capacitor C33 and the first output node NO31 may be connected, and sampling may be performed on the electrical signal of the first output node NO31.

The power voltage VPIX may be applied to a first terminal of the third capacitor C33, and a second terminal of the third capacitor C33 may be connected to the third sampling transistor SMP33. According to the switching operation of the third sampling transistor SMP33, charge may be accumulated in the third capacitor C33. For example, in the third capacitor C33, charge accumulated at a first floating diffusion node FD1 by a photoelectric-charge accumulation operation may be accumulated.

The fourth sampling transistor SMP34 may be connected between the first output node NO31 and the fourth capacitor C34. A first terminal of the fourth sampling transistor SMP34 may be connected to the first output node NO31, and a second terminal of the fourth sampling transistor SMP34 may be connected to the fourth capacitor C34. The fourth sampling transistor SMP34 may be controlled by a fourth sampling control signal SMPS34. When the fourth sampling transistor SMP34 is turned on, the fourth capacitor C34 and the first output node NO31 may be connected, and sampling may be performed on the electrical signal of the first output node NO31.

The power voltage VPIX may be applied to a first terminal of the fourth capacitor C34, and a second terminal of the fourth capacitor C34 may be connected to the fourth sampling transistor SMP34. Charge may be accumulated in the fourth capacitor C34 according to the switching operation of the fourth sampling transistor SMP34. For example, in the fourth capacitor C34, charge accumulated at a first floating diffusion node FD1 by a photoelectric-charge accumulation operation may be accumulated.

The pixel signal circuit 1005 may include a second drive transistor SF2 and a selection transistor SX. The pixel signal circuit 1005 of FIG. 9 is similar to the pixel signal circuit 305 of FIG. 3, and therefore, the description of the pixel signal circuit 305 of FIG. 3 may also be applied to the pixel signal circuit 1005 of FIG. 9.

Figure 10:
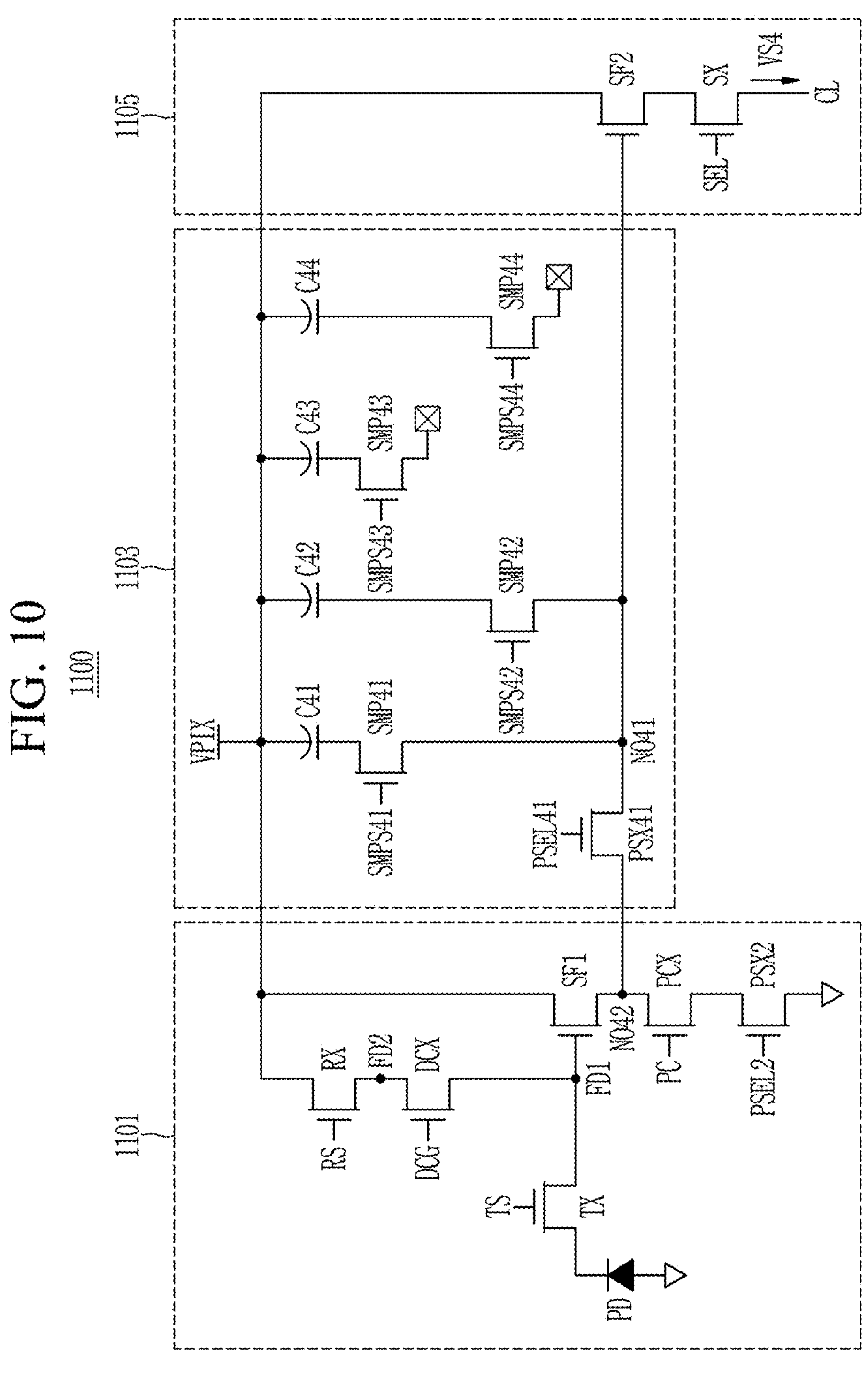
FIG. 10 is a circuit diagram illustrating a dummy pixel according to an embodiment.

FIG. 10 is a circuit diagram illustrating a dummy pixel according to an embodiment.

In some embodiments, a pixel 1100 may be a dummy pixel according to an embodiment. Accordingly, a pixel signal VS4 that is output from the pixel 1100 may be a dummy signal.

Referring to FIG. 10, a pixel 1100 may include a photoelectric-charge generating circuit 1101, a sampling circuit 1103, and a pixel signal circuit 1105. Control signals TS, RS, DCG, PC, PSEL2, PSEL41, SMPS41, SMPS42, SMPS43, SMPS44, and SEL received from the row driver 130 may be applied to the pixel 1100.

The photoelectric-charge generating circuit 1101, the sampling circuit 1103, and the pixel signal circuit 1105 may be similar to the photoelectric-charge generating circuit 1001, the sampling circuit 1003, and the pixel signal circuit 1005 of the pixel 1000 described with reference to FIG. 9, and there may be differences only in the structures of a third sampling transistor SMP43 and a fourth sampling transistor SMP44.

For example, the third sampling transistor SMP43 may be connected to a third capacitor C43. A first terminal of the third sampling transistor SMP43 may become floating, and a second terminal of the third sampling transistor SMP43 may be connected to the third capacitor C43. The power voltage VPIX may be applied to a first terminal of the third capacitor C43, and a second terminal of the third capacitor C43 may be connected to the third sampling transistor SMP43.

The fourth sampling transistor SMP44 may be connected to a fourth capacitor C44. A first terminal of the fourth sampling transistor SMP44 may become floating, and a second terminal of the fourth sampling transistor SMP44 may be connected to the fourth capacitor C44. The power voltage VPIX may be applied to a first terminal of the fourth capacitor C44, and a second terminal of the fourth capacitor C44 may be connected to the fourth sampling transistor SMP44.

Figure 11:
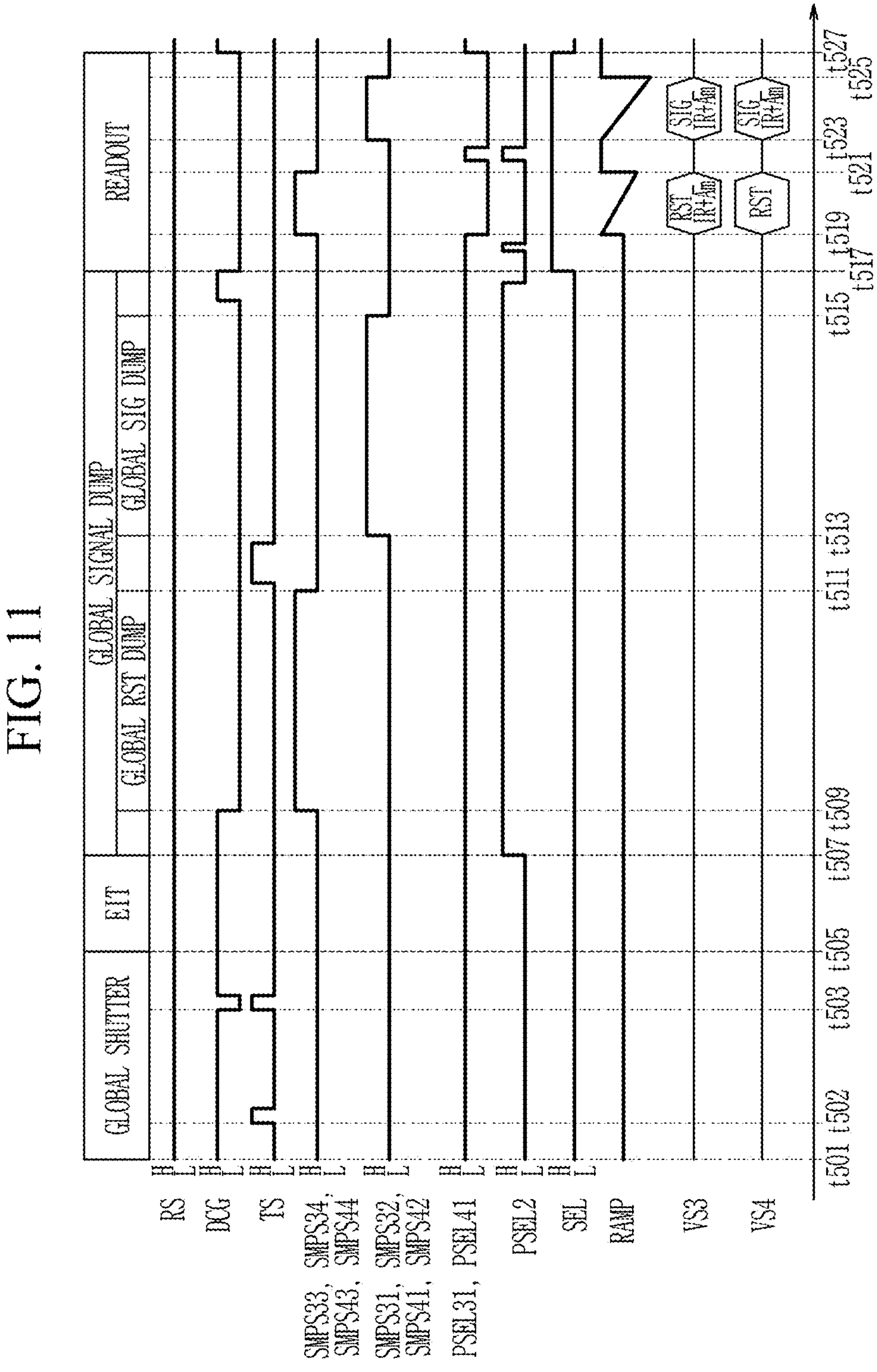
FIG. 11 is a timing diagram illustrating an operation of an image sensor according to an embodiment.

FIG. 11 is a timing diagram illustrating an operation of an image sensor according to an embodiment.

For example, FIG. 11 is a timing diagram illustrating an operation of an image sensor 100 including an active pixel according to the pixel 1000 of FIG. 9 and a dummy pixel according to the pixel 1100 of FIG. 10. Also, FIG. 11 is a timing diagram illustrating when the image sensor 100 operates for one frame without setting the ASM.

Since the operations of control signals that drive the active pixel and the dummy pixel are similar, for ease of explanation, an operation of the image sensor 100 will be described with a focus on the active pixel 1000.

A first sampling control signal SMPS31, a second sampling control signal SMPS32, a first sampling control signal SMPS41, and a second sampling control signal SMPS42 may be identical. Further, a third sampling control signal SMPS33, a fourth sampling control signal SMPS34, a third sampling control signal SMPS43, and a fourth sampling control signal SMPS44 may be identical.

A global shutter section (GLOBAL SHUTTER) (from a time point t501 to a time point t505) is similar to the global shutter section (from the time point t101 to the time point t105) of FIG. 4, and therefore, the description of the global shutter section (from the time point t101 to the time point t105) of FIG. 4 may also be applied to the global shutter section (from the time point t501 to the time point t505).

An effective integration time (EIT) section (from the time point t505 to a time point t507) is similar to the effective integration time (EIT) section (from the time point t105 to the time point t107) of FIG. 4, and therefore, the description of the effective integration time (EIT) section (from the time point t105 to the time point t107) of FIG. 4 may also be applied to the effective integration time section (from the time point t505 to the time point t507).

Here, the operation of each of the first sampling control signal SMPS31, the second sampling control signal SMPS32, the first sampling control signal SMPS41, and the second sampling control signal SMPS42 may be identical to the operation of the first sampling control signal SMPS11 shown in FIG. 4. Further, the operation of each of the third sampling control signal SMPS33, the fourth sampling control signal SMPS34, the third sampling control signal SMPS43, and the fourth sampling control signal SMPS44 may be identical to the operation of the second sampling control signal SMPS12 shown in FIG. 4. The global signal dumping section (GLOBAL SIGNAL DUMP) (from the time point t507 to a time point t517) may be a section in which sampling is performed on the charge accumulated in the first floating diffusion node FD1.

First, at the time point t507, the second precharge select control signal PSEL2 may transition from the low level L to the high level H.

When the second precharge select control signal PSEL2 is at the high level H, the second precharge select transistor PSX2 may be turned on, and the first output node NO31 may be reset through the second precharge select transistor PSX2 and the precharge transistor PCX. Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO32. When the first precharge select control signal PSEL31 is at the high level H, the first precharge select transistor PSX11 may be turned on. As a result, the reset voltage buffered at the second output node NO32 may be transferred to the first output node NO31.

For a global reset dumping section (GLOBAL RST DUMP) (from the time point t509 to the time point t511), sampling may be performed on the reset voltage.

First, at the time point t509, the gain control signal DCG may transition from the high level H to the low level L, and the third sampling control signal SMPS33 and the fourth sampling control signal SMPS34 may transition from the low levels L to the high levels H.

When the gain control signal DCG is at the low level L, the gain control transistor DCX may be turned on, and when the third sampling control signal SMPS33 and the fourth sampling control signal SMPS34 are at the high levels H, the third sampling transistor SMP33 and the fourth sampling transistor SMP34 may be turned on. As a result, the third capacitor C33 and the fourth capacitor C34 may perform sampling on the signal of the first output node NO31. In other words, the third capacitor C33 and the fourth capacitor C34 may perform sampling on the reset voltage.

Meanwhile, when the third sampling control signal SMPS43 and the fourth sampling control signal SMPS44 are at the high levels H, the third sampling transistor SMP43 and the fourth sampling transistor SMP44 may be turned on. One end of the third capacitor C43 and one end of the fourth capacitor C44 may become floating.

At the time point t511, the transfer control signal TS may transition from the low level L to the high level H, and the third sampling control signal SMPS33 and the fourth sampling control signal SMPS34 may transition from the high levels H to the low levels L.

When the transfer control signal TS is at the high level H, the transfer transistor TX may be turned on. Photoelectric charge generated by the photoelectric element PD for the effective integration time (EIT) section may be transferred to the first floating diffusion node FD1. The first drive transistor SF1 may buffer an image voltage accumulated at the first floating diffusion node FD1, at the second output node NO32. When the first precharge select control signal PSEL31 is at the high level H, the first precharge select transistor PSX11 may be turned on. As a result, the image voltage buffered at the second output node NO32 may be transferred to the first output node NO31.

For the global signal dumping section (GLOBAL SIG DUMP) (from the time point t513 to the time point t515), sampling may be performed on the image voltage.

At the time point t513, the transfer control signal TS may transition from the high level H to the low level L, and the first sampling control signal SMPS31 and the second sampling control signal SMPS32 may transition from the low levels L to the high levels H.

When the first sampling control signal SMPS31 and the second sampling control signal SMPS32 are at the high levels H, the first sampling transistor SMP31 and the second sampling transistor SMP32 may be turned on. As a result, the first capacitor C31 and the second capacitor C32 may perform sampling on the signal of the first output node NO31. In other words, the first capacitor C31 and the second capacitor C32 may perform sampling on the image voltage.

At the time point t515, the gain control signal DCG may transition from the low level L to the high level H, and the first sampling control signal SMPS31 and the second sampling control signal SMPS32 may transition from the high level H to the low level L.

When the gain control signal DCG is at the high level H, the gain control transistor DCX may be turned on. Since the reset transistor RX has been reset by the reset control signal RS at the high level H, the first floating diffusion node FD1 and the second floating diffusion node FD2 may be reset.

Thereafter, at the time point t516, the second precharge select control signal PSEL2 may transition from the high level H to the low level L.

A readout section (READOUT) (from the time point t517 to a time point t527) may be a section in which pixel signals are output from the pixel array 140. For example, the readout section (from the time point t517 to the time point t527) may be a section in which a pixel signal VS3 generated by the pixel 1000 and a pixel signal VS4 generated by the pixel 1100 are output.

First, at the time point t517, the gain control signal DCG may transition from the high level H to the low level L, and the selection control signal SEL may transition from the low level L to the high level H.

Thereafter, the second precharge select control signal PSEL2 may be output in a pulse form.

At the time point t519, the third sampling control signal SMPS33 and the fourth sampling control signal SMPS34 may transition from the low levels L to the high levels H, and the first precharge select control signal PSEL31 may transition from the high level H to the low level L.

When the third sampling control signal SMPS33 and the fourth sampling control signal SMPS34 are at the high levels H, the third sampling transistor SMP33 and the fourth sampling transistor SMP34 may be turned on. In the section in which the third sampling control signal SMPS33 and the fourth sampling control signal SMPS34 are maintained at the high levels H, a reset signal RST_IR+Amb corresponding to the reset voltage sampled by the third capacitor C33 and the fourth capacitor C34 may be output as the pixel signal VS3 through the column line CL.

Meanwhile, at the time point t519, the third sampling control signal SMPS43 and the fourth sampling control signal SMPS44 also may transition from the low levels L to the high levels H, and a first precharge select control signal PSEL41 may transition from the high level H to the low level L.

When the third sampling control signal SMPS43 and the fourth sampling control signal SMPS44 are at the high levels H, the third sampling transistor SMP43 and the fourth sampling transistor SMP44 may be turned on. As a result, one end of the third capacitor C43 and one end of the fourth capacitor C44 may become floating. A signal RST corresponding to the charge of a first output node NO41 may be output as the pixel signal VS4 through the column line CL.

Meanwhile, while the third sampling control signal SMPS33, the fourth sampling control signal SMPS34, the third sampling control signal SMPS43, and the fourth sampling control signal SMPS44 are maintained at the high levels, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the reset signal RST_IR+Amb and compare the ramp signal RAMP and the signal RST.

At the time point t521, the third sampling control signal SMPS33 and the fourth sampling control signal SMPS34 may transition from the high levels H to the low levels L.

Thereafter, the first precharge select control signal PSEL31 and the second precharge select control signal PSEL2 may be output in pulse forms. While the first precharge select control signal PSEL31 and the second precharge select control signal PSEL2 are maintained at the high levels H, the first output node NO31 may be reset.

At the time point t523, the first sampling control signal SMPS31 and a second sampling control signal SMPS32 may transition from the low levels L to the high levels H.

When the first sampling control signal SMPS31 and the second sampling control signal SMPS32 are at the high levels H, the first sampling transistor SMP31 and the second sampling transistor SMP32 may be turned on. In the section in which the first sampling control signal SMPS31 and the second sampling control signal SMPS32 are maintained at the high levels H, an image signal SIG_IR+Amb corresponding to the image voltage sampled by the first capacitor C31 and the second capacitor C32 may be output as the pixel signal VS3 through the column line CL.

At the time point t523, the first sampling control signal SMPS41 and the second sampling control signal SMPS42 also may transition from the low levels L to the high levels H.

When the first sampling control signal SMPS41 and the second sampling control signal SMPS42 are at the high levels H, a first sampling transistor SMP41 and a second sampling transistor SMP42 may be turned on. In the section in which the first sampling control signal SMPS41 and the fourth sampling control signal SMPS44 are maintained at the high levels H, an image signal SIG_IR+Amb corresponding to an image voltage sampled by a first capacitor C41 and a second capacitor C42 may be output as the pixel signal VS4 through the column line CL.

Meanwhile, while the first sampling control signal SMPS31 and the second sampling control signal SMPS32 are maintained at the high levels H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR+Amb.

At the time point t525, the first sampling control signal SMPS31 may transition from the high level H to the low level L.

Thereafter, at the time point t527, the selection control signal SEL may transition from the high level H to the low level L.

The readout circuit 150 may perform a correlated double sampling operation based on the result of the comparison between the reset signal RST_IR+Amb received from the active pixel and the ramp signal RAMP and the result of the comparison between the image signal SIG_IR+Amb and the ramp signal RAMP. Accordingly, the image sensor 100 may generate an image output signal IMS according to the photoelectric charge accumulated by the ambient light and the light source 13.

The readout circuit 150 may generate a mode data signal MDS based on the difference between the signal RST received from the dummy pixel and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

When the controller 110 determines that the intensity of the ambient light exceeds the preset threshold value based on the mode data signal MDS, the controller 110 may determine to set the ASM.

Meanwhile, although it is shown in FIG. 11 that the sampled reset voltage is stored in the third capacitor and the fourth capacitor and the sampled image voltage is stored in the first and second capacitors, embodiments of the present disclosure are not limited thereto. For example, in some embodiments, the image sensor 100 may appropriately operate based on the amount of photoelectric charge that is generated by the photoelectric elements PD.

Figure 12:
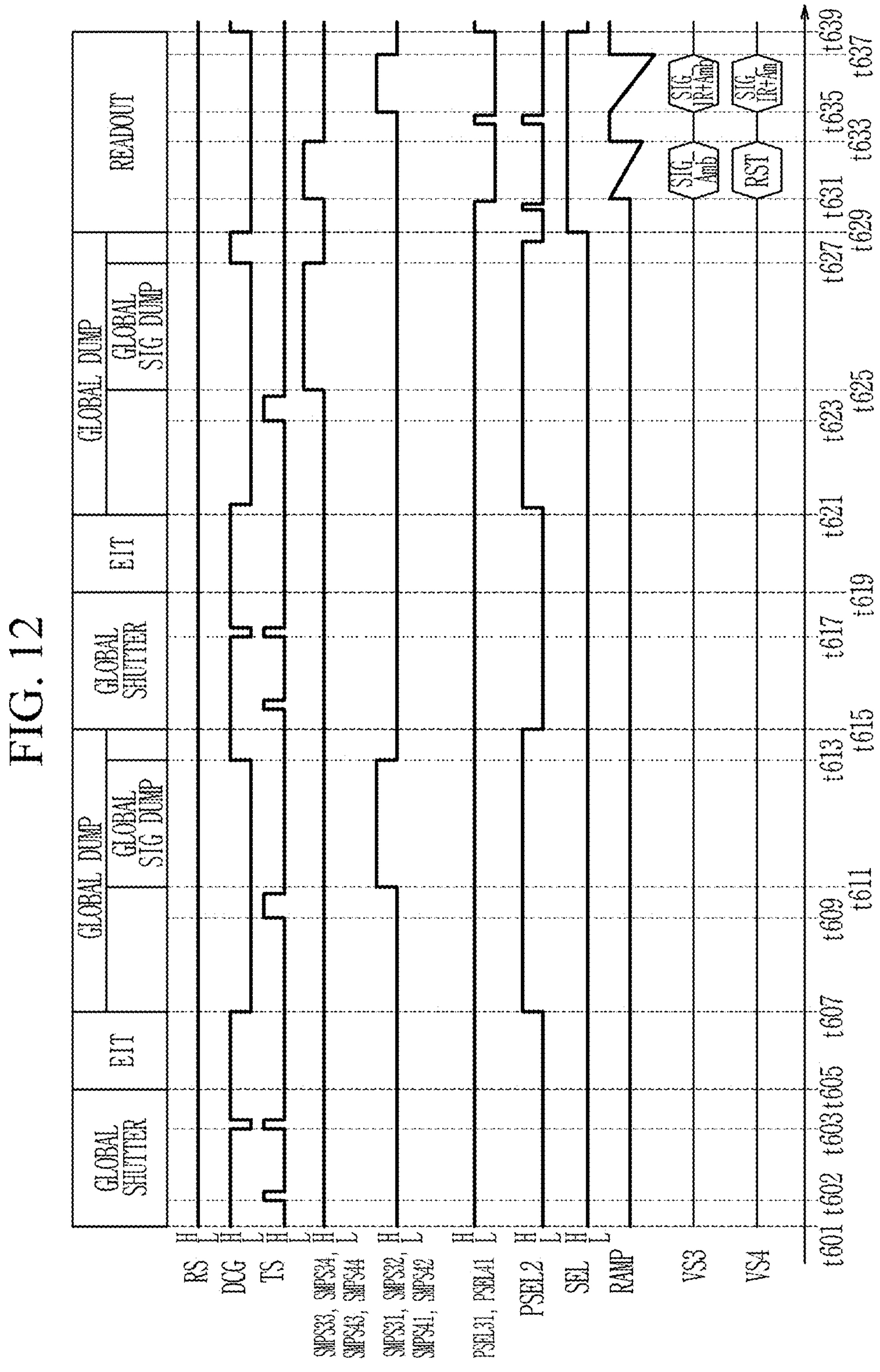
FIG. 12 is a timing diagram illustrating an operation of the image sensor according to an embodiment.

FIG. 12 is a timing diagram illustrating an operation of the image sensor according to an embodiment.

For example, FIG. 12 is a timing diagram illustrating an operation of an image sensor 100 including an active pixel according to the pixel 1000 of FIG. 9 and a dummy pixel according to the pixel 1100 of FIG. 10. Also, FIG. 12 is a timing diagram illustrating when the image sensor 100 operates in the ASM for one frame.

Since the operations of control signals that drive the active pixel and the dummy pixel are similar, for ease of explanation, an operation of the image sensor 100 will be described with a focus on the active pixel 1000.

A first sampling control signal SMPS31, a second sampling control signal SMPS32, a first sampling control signal SMPS41, and a second sampling control signal SMPS42 may be identical. Further, a third sampling control signal SMPS33, a fourth sampling control signal SMPS34, a third sampling control signal SMPS43, and a fourth sampling control signal SMPS44 may be identical.

A first global shutter section (GLOBAL SHUTTER) (from a time point t601 to a time point t605) is similar to the global shutter section (from the time point t201 to the time point t205) of FIG. 5, and therefore, the description of the global shutter section (from the time point t201 to the time point t205) of FIG. 5 may also be applied to the first global shutter section (from the time point t601 to the time point t605).

A first effective integration time (EIT) section (from the time point t605 to a time point t607) is similar to the first effective integration time (EIT) section (from the time point t205 to the time point t207), and therefore, the description of the first effective integration time section (from the time point t205 to the time point t207) of FIG. 5 may also be applied to the first effective integration time section (from the time point t605 to the time point t607).

Here, the operation of each of the first sampling control signal SMPS31, the second sampling control signal SMPS32, the first sampling control signal SMPS41, and the second sampling control signal SMPS42 may be identical to the operation of the first sampling control signal SMPS11 shown in FIG. 5. Further, the operation of each of the third sampling control signal SMPS33, the fourth sampling control signal SMPS34, the third sampling control signal SMPS43, and the fourth sampling control signal SMPS44 may be identical to the operation of the second sampling control signal SMPS12 shown in FIG. 5.

A first global signal dumping section (GLOBAL SIGNAL DUMP) (from the time point t607 to a time point t615) may be a section in which sampling is performed on the charge accumulated in the first floating diffusion node FD1.

First, at the time point t607, the second precharge select control signal PSEL2 may transition from the low level L to the high level H.

When the second precharge select control signal PSEL2 is at the high level H, the second precharge select transistor PSX2 may be turned on, and the first output node NO31 may be reset through the second precharge select transistor PSX2 and the precharge transistor PCX.

Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO32. When the first precharge select control signal PSEL31 is at the high level H, the first precharge select transistor PSX31 may be turned on. As a result, the reset voltage buffered at the second output node NO32 may be transferred to the first output node NO31.

At the time point t609, the transfer control signal TS may transition from the low level L to the high level H.

When the transfer control signal TS is at the high level H, the transfer transistor TX may be turned on. As a result, photoelectric charge generated for the first effective integration time (EIT) section may be transferred to the first floating diffusion node FD1. The first drive transistor SF1 may buffer an image voltage accumulated at the first floating diffusion node FD1, at the second output node NO32. When the first precharge select control signal PSEL31 is at the high level H, the first precharge select transistor PSX31 may be turned on. As a result, the image voltage buffered at the second output node NO32 may be transferred to the first output node NO31. At this time, the image voltage may be a voltage generated based on the light source 13 and the ambient light.

At the time point t611, the transfer control signal TS may transition from the high level H to the low level L, and the first sampling control signal SMPS31 and the second sampling control signal SMPS32 may transition from the low levels L to the high levels H.

When the first sampling control signal SMPS31 and the second sampling control signal SMPS32 are at the high levels H, the first sampling transistor SMP31 and the second sampling transistor SMP32 may be turned on. As a result, the first capacitor C31 and the second capacitor C32 may perform sampling on the signal of the first output node NO31. In other words, the first capacitor C31 and the second capacitor C32 may perform sampling on the image voltage caused by the light source 13 and the ambient light.

At the time point t613, the gain control signal DCG may transition from the low level L to the high level H, and the first sampling control signal SMPS31 and the second sampling control signal SMPS32 may transition from the high level H to the low level L.

When the gain control signal DCG is at the high level H, the gain control transistor DCX may be turned on. Since the reset transistor RX has been reset by the reset control signal RS at the high level H, the first floating diffusion node FD1 and the second floating diffusion node FD2 may be reset.

A second global shutter section (GLOBAL SHUTTER) (from a time point t615 to a time point t619) is similar to the global shutter section (from the time point t201 to the time point t205) of FIG. 5, and therefore, the description of the global shutter section (from the time point t201 to the time point t205) of FIG. 5 may also be applied to the second global shutter section (from the time point t615 to the time point t619).

A second effective integration time (EIT) section (from the time point t619 to a time point t621) is similar to the second effective integration time (EIT) section (from the time point t219 to the time point t221) of FIG. 5, and therefore, the description of the second effective integration time section (from the time point t219 to the time point t221) of FIG. 5 may also be applied to the first effective integration time section (from the time point t619 to the time point t621).

A second global signal dumping section (GLOBAL SIGNAL DUMP) (from the time point t621 to a time point t629) may be a section in which sampling is performed on the charge accumulated in the first floating diffusion node FD1.

First, at the time point t621, the second precharge select control signal PSEL2 may transition from the low level L to the high level H.

When the second precharge select control signal PSEL2 is at the high level H, the second precharge select transistor PSX2 may be turned on, and the first output node NO31 may be reset through the second precharge select transistor PSX2 and the precharge transistor PCX.

Meanwhile, the first floating diffusion node FD1 might have been reset to the power voltage VPIX. The first drive transistor SF1 may buffer a reset voltage corresponding to the power voltage VPIX of the first floating diffusion node FD1, at the second output node NO32. When the first precharge select control signal PSEL31 is at the high level H, the first precharge select transistor PSX31 may be turned on. As a result, the reset voltage buffered at the second output node NO32 may be transferred to the first output node NO31.

At the time point t623, the transfer control signal TS may transition from the low level L to the high level H.

When the transfer control signal TS is at the high level H, the transfer transistor TX may be turned on. As a result, photoelectric charge generated based on the ambient light by the photoelectric element PD for the second effective integration time (EIT) section may be transferred to the first floating diffusion node FD1. The first drive transistor SF1 may buffer an image voltage accumulated at the first floating diffusion node FD1, at the second output node NO32. When the first precharge select control signal PSEL31 is at the high level H, the first precharge select transistor PSX31 may be turned on. As a result, the image voltage buffered at the second output node NO32 may be transferred to the first output node NO31.

At the time point t625, the transfer control signal TS may transition from the high level H to the low level L, and the third sampling control signal SMPS33 and the fourth sampling control signal SMPS34 may transition from the low levels L to the high levels H.

When the third sampling control signal SMPS33 and the fourth sampling control signal SMPS34 are at the high levels H, the third sampling transistor SMP33 and the fourth sampling transistor SMP34 may be turned on. As a result, the third capacitor C33 and the fourth capacitor C34 may perform sampling on the signal of the first output node NO31. In other words, the third capacitor C33 and the fourth capacitor C34 may perform sampling on the image voltage caused by the ambient light.

At the time point t627, the gain control signal DCG may transition from the high level H to the low level L, and the third sampling control signal SMPS33 and the fourth sampling control signal SMPS34 may transition from the high levels H to the low levels L.

When the gain control signal DCG is at the high level H, the gain control transistor DCX may be turned on. Since the reset transistor RX has been reset by the reset control signal RS at the high level H, the first floating diffusion node FD1 and the second floating diffusion node FD2 may be reset.

Thereafter, the second precharge select control signal PSEL2 may transition from the high level H to the low level L.

A readout section (READOUT) (from the time point t629 to a time point t639) may be a section in which pixel signals are output from the pixel array 140. For example, the readout section (from the time point t629 to the time point t639) may be a section in which a pixel signal VS3 and a pixel signal VS4 are output from the pixel 1000 and the pixel 1100, respectively.

First, at the time point t629, the gain control signal DCG may transition from the high level H to the low level L, and the selection control signal SEL may transition from the low level L to the high level H.

Thereafter, the second precharge select control signal PSEL2 may be output in a pulse form.

At the time point t631, the second sampling control signal SMPS12 may transition from the low level L to the high level H, and the first precharge select control signal PSEL31 may transition from the high level H to the low level L.

At this time, when the third sampling control signal SMPS33 and the fourth sampling control signal SMPS34 are at the high levels H, the third sampling transistor SMP33 and the fourth sampling transistor SMP34 may be turned on. In the section in which the third sampling control signal SMPS33 and the fourth sampling control signal SMPS34 are maintained at the high levels H, an image signal SIG_Amb corresponding to an image voltage sampled by the third capacitor C33 and the fourth capacitor C34 may be output as the pixel signal VS3 through the column line CL. At this time, the image voltage sampled by the third capacitor C33 and the fourth capacitor C34 may be a voltage based on the photoelectric charge generated by the ambient light.

Meanwhile, at the time point t631, the third sampling control signal SMPS43 and the fourth sampling control signal SMPS44 may also transition from the low levels L to the high levels H, and the first precharge select control signal PSEL41 may transition from the high level H to the low level L.

When the third sampling control signal SMPS43 and the fourth sampling control signal SMPS44 are at the high levels H, the third sampling transistor SMP43 and the fourth sampling transistor SMP44 may be turned on. As a result, one end of the third capacitor C43 and one end of the fourth capacitor C44 may become floating. A signal RST corresponding to the charge of a first output node NO41 may be output as the pixel signal VS4 through the column line CL.

Meanwhile, while the third sampling control signal SMPS33 and the fourth sampling control signal SMPS34 are maintained at the high levels, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_Amb and compare the ramp signal RAMP and the signal RST.

At the time point t633, the third sampling control signal SMPS33 and the fourth sampling control signal SMPS34 may transition from the high levels H to the low levels L.

Thereafter, the first precharge select control signal PSEL31 and the second precharge select control signal PSEL2 may be output in pulse forms. While the first precharge select control signal PSEL31 and the second precharge select control signal PSEL2 are maintained at the high levels H, the first output node NO31 may be reset.

At the time point t635, the first sampling control signal SMPS31 and a second sampling control signal SMPS32 may transition from the low levels L to the high levels H.

When the first sampling control signal SMPS31 and the second sampling control signal SMPS32 are at the high levels H, the first sampling transistor SMP31 and the second sampling transistor SMP32 may be turned on. In the section in which the first sampling control signal SMPS31 and the second sampling control signal SMPS32 are maintained at the high levels H, an image signal SIG_IR_Amb corresponding to the image voltage sampled by the first capacitor C31 and the second capacitor C32 may be output as the pixel signal VS3 through the column line CL. At this time, the image voltage sampled by the first capacitor C31 and the second capacitor C32 may be a voltage based on the photoelectric charge generated by the light source 13 and the ambient light.

At the time point t635, the first sampling control signal SMPS41 and the second sampling control signal SMPS42 may also transition from the low levels L to the high levels H.

When the first sampling control signal SMPS41 and the second sampling control signal SMPS42 are at the high levels H, a first sampling transistor SMP41 and a second sampling transistor SMP42 may be turned on. In the section in which the first sampling control signal SMPS41 and the fourth sampling control signal SMPS44 are maintained at the high levels H, an image signal SIG_IR+Amb corresponding to an image voltage sampled by a first capacitor C41 and a second capacitor C42 may be output as the pixel signal VS4 through the column line CL. Meanwhile, while the first sampling control signal SMPS31 and the second sampling control signal SMPS32 are maintained at the high levels H, a ramp signal RAMP may decrease (or increase) at a constant slope. While the voltage level of the ramp signal RAMP varies at the constant slope, the readout circuit (reference symbol "150" in FIG. 1) may compare the ramp signal RAMP and the image signal SIG_IR_Amb.

At the time point t637, the first sampling control signal SMPS31 and the second sampling control signal SMPS32 may transition from the high level H to the low level L.

Thereafter, at the time point t639, the selection control signal SEL may transition from the high level H to the low level L.

The readout circuit 150 may perform a correlated double sampling operation based on the result of the comparison between the image signal SIG_Amb of the pixel signal VS3 received from the pixel 1000 and the ramp signal RAMP and the result of the comparison between the image signal SIG_IR_Amb and the ramp signal RAMP. Accordingly, the image sensor 100 may generate an image output signal IMS from which noise caused by the ambient light has been removed.

Also, the readout circuit 150 may perform a correlated double sampling operation based on the result of the comparison between the signal RST of the pixel signal VS4 received from the pixel 1100 and the ramp signal RAMP and the result of the comparison between the image signal SIG_IR+Amb and the ramp signal RAMP. The readout circuit 150 may generate a mode data signal MDS based on the difference between the signal RST and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

Figure 13:
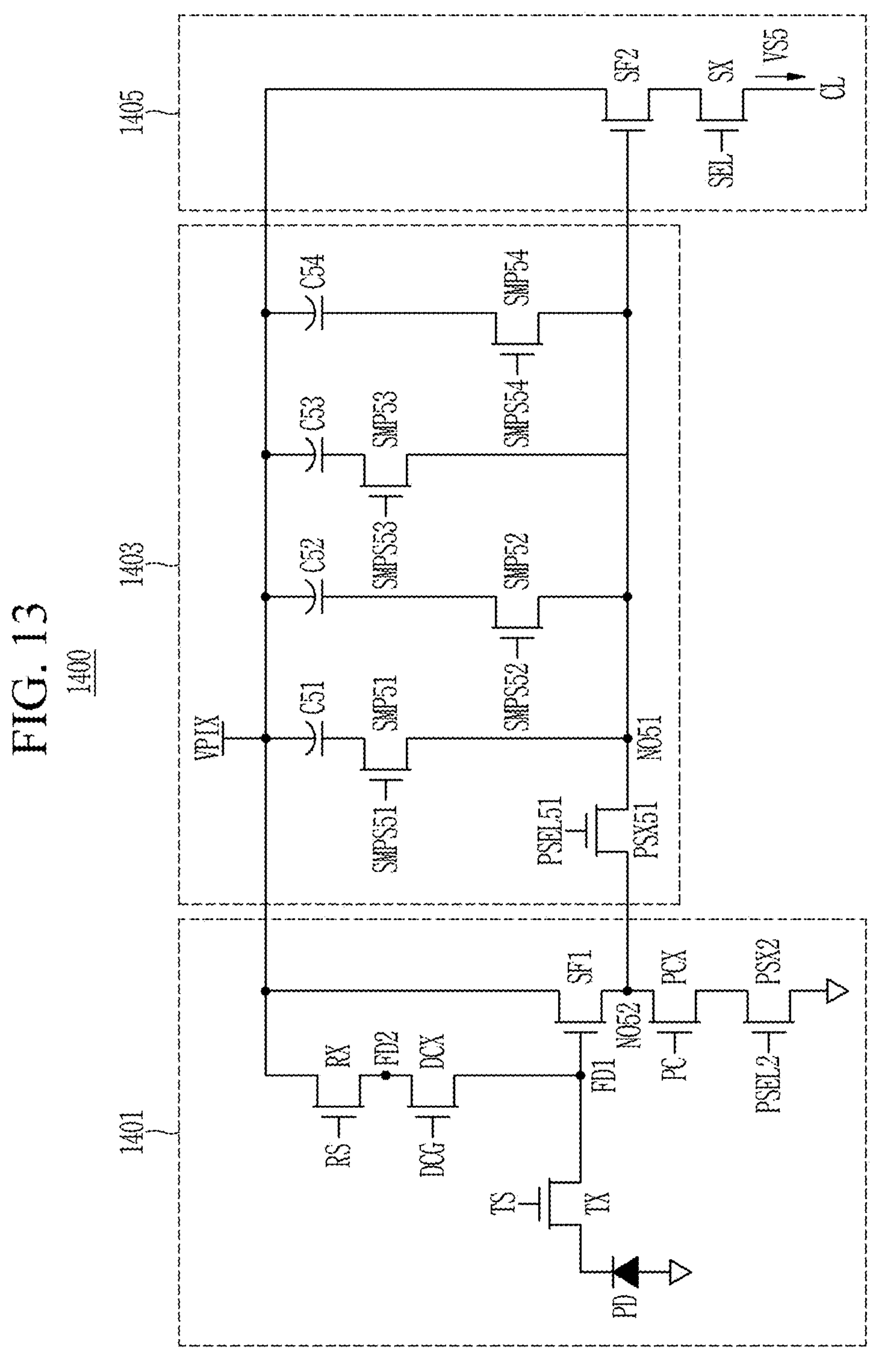
FIG. 13 is a circuit diagram illustrating a dummy pixel according to an embodiment.

FIG. 13 is a circuit diagram illustrating a dummy pixel according to an embodiment.

In some embodiments, a pixel 1400 may be a dummy pixel described above. Accordingly, a pixel signal VS5 that is output from the pixel 1400 may be a dummy signal.

Referring to FIG. 13, a pixel 1400 may include a photoelectric-charge generating circuit 1401, a sampling circuit 1403, and a pixel signal circuit 1405. Control signals TS, RS, DCG, PC, PSEL2, PSEL51, SMPS51, SMPS52, SMPS53, SMPS54, and SEL received from the row driver 130 may be applied to the pixel 1400.

The photoelectric-charge generating circuit 1401, the sampling circuit 1403, and the pixel signal circuit 1405 may be similar to the photoelectric-charge generating circuit 1001, the sampling circuit 1003, and the pixel signal circuit 1005 of the pixel 1000 described with reference to FIG. 9. However, signals that are applied to a third sampling transistor SMP53 and a fourth sampling transistor SMP54 of FIG. 13 may be different from the signals that are applied to the third sampling transistor SMP33 and the fourth sampling transistor SMP34 of FIG. 9.

Figure 14:
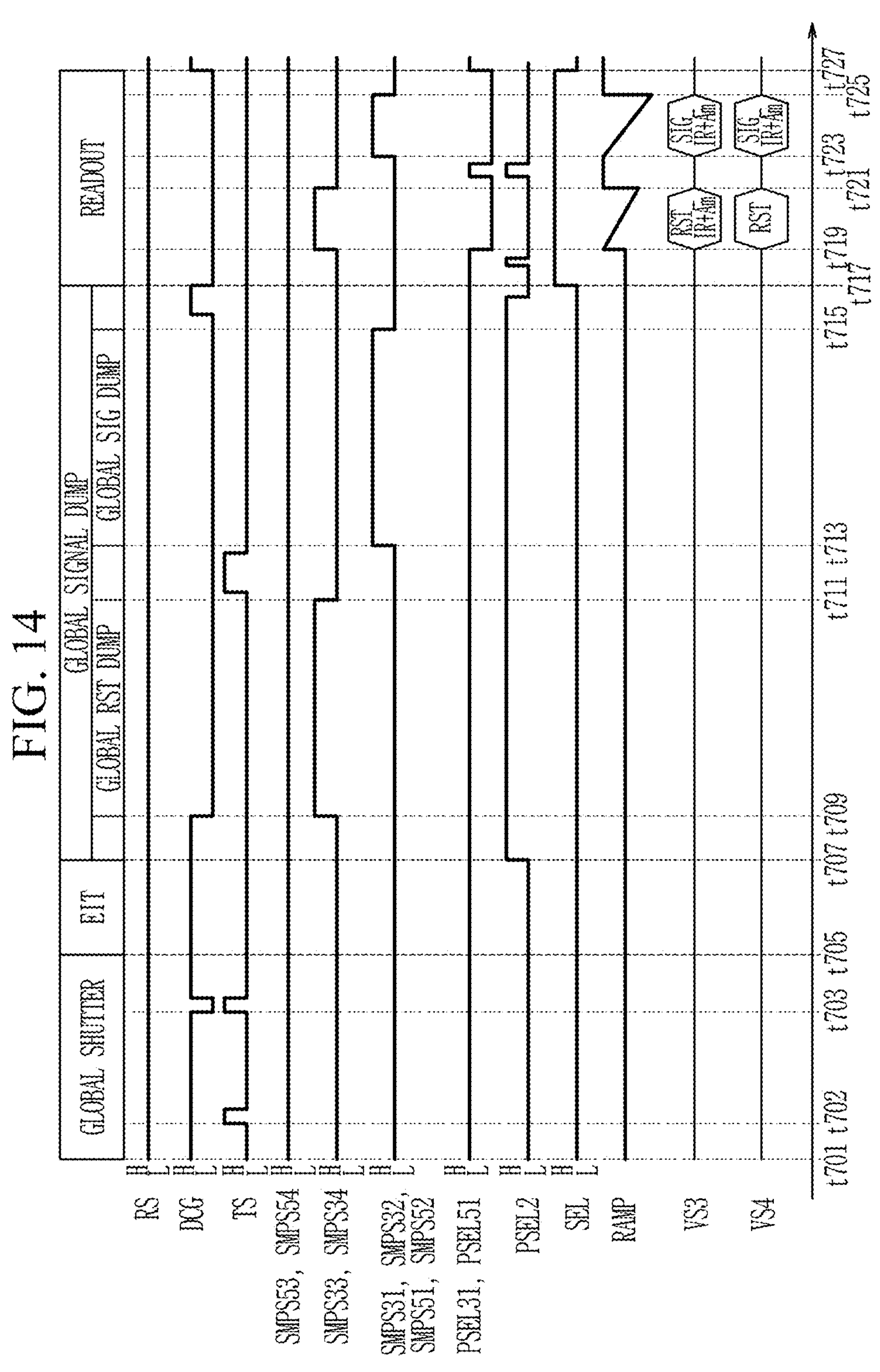
FIG. 14 is a timing diagram illustrating an operation of an image sensor according to an embodiment.

FIG. 14 is a timing diagram illustrating an operation of an image sensor according to an embodiment.

For example, FIG. 14 is a timing diagram illustrating an operation of an image sensor 100 including an active pixel according to the pixel 1000 of FIG. 9 and a dummy pixel according to the pixel 1400 of FIG. 13. Also, FIG. 14 is a timing diagram illustrating when the image sensor 100 operates for one frame without setting the ASM.

A first sampling control signal SMPS31, a second sampling control signal SMPS32, a first sampling control signal SMPS51, and a second sampling control signal SMPS52 may be identical.

A global shutter section (GLOBAL SHUTTER) (from a time point t701 to a time point t705), an effective integration time (EIT) section (from the time point t705 to a time point t707), a global signal dumping section (GLOBAL SIGNAL DUMP) (from the time point t707 to a time point t717), and a readout section (READOUT) (from the time point t717 to a time point t727) may be similar to the global shutter section (GLOBAL SHUTTER) (from the time point t501 to the time point t505), the effective integration time (EIT) section (from the time point t505 to the time point t507), the global signal dumping section (GLOBAL SIGNAL DUMP) (from the time point t507 to the time point t517), and the readout section (READOUT) (from the time point t517 to the time point t527) shown in FIG. 11.

However, in the global shutter section (from the time point t701 to the time point t705) to the readout section (from the time point t717 to the time point t727), a third sampling control signal SMPS53 and a fourth sampling control signal SMPS54 that are applied to the dummy pixel may be maintained at low levels L. When the third sampling control signal SMPS53 and the fourth sampling control signal SMPS54 are at the low levels L, the third sampling transistor SMP53 and the fourth sampling transistor SMP54 may be turned off.

Therefore, in the global signal dumping section (from the time point t707 to the time point t717), the charge of a first output node NO51 cannot be sampled by a third capacitor C53 and a fourth capacitor C54. In the readout section (from the time point t717 to the time point t727), the pixel 1400 may output a signal RST corresponding to the charge of the first output node NO51, as a pixel signal VS4, through a column line CL.

The readout circuit 150 may perform a correlated double sampling operation based on the result of the comparison between the reset signal RST_IR+Amb received from the active pixel and the ramp signal RAMP and the result of the comparison between the image signal SIG_IR+Amb and the ramp signal RAMP. Accordingly, the image sensor 100 may generate an image output signal IMS according to the photoelectric charge accumulated by the ambient light and the light source 13.

The readout circuit 150 may generate a mode data signal MDS based on the difference between the signal RST received from the dummy pixel and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

When the controller 110 determines that the intensity of the ambient light exceeds the preset threshold value based on the mode data signal MDS, the controller 110 may determine to set the ASM.

Although it is shown in FIG. 14 that the sampled reset voltage is stored in the third capacitor and the fourth capacitor and the sampled image voltage is stored in the first and second capacitors, embodiments of the present disclosure are not limited thereto. For example, in some embodiments, the image sensor 100 may appropriately operate based on the amount of photoelectric charge that is generated by the photoelectric elements PD.

Figure 15:
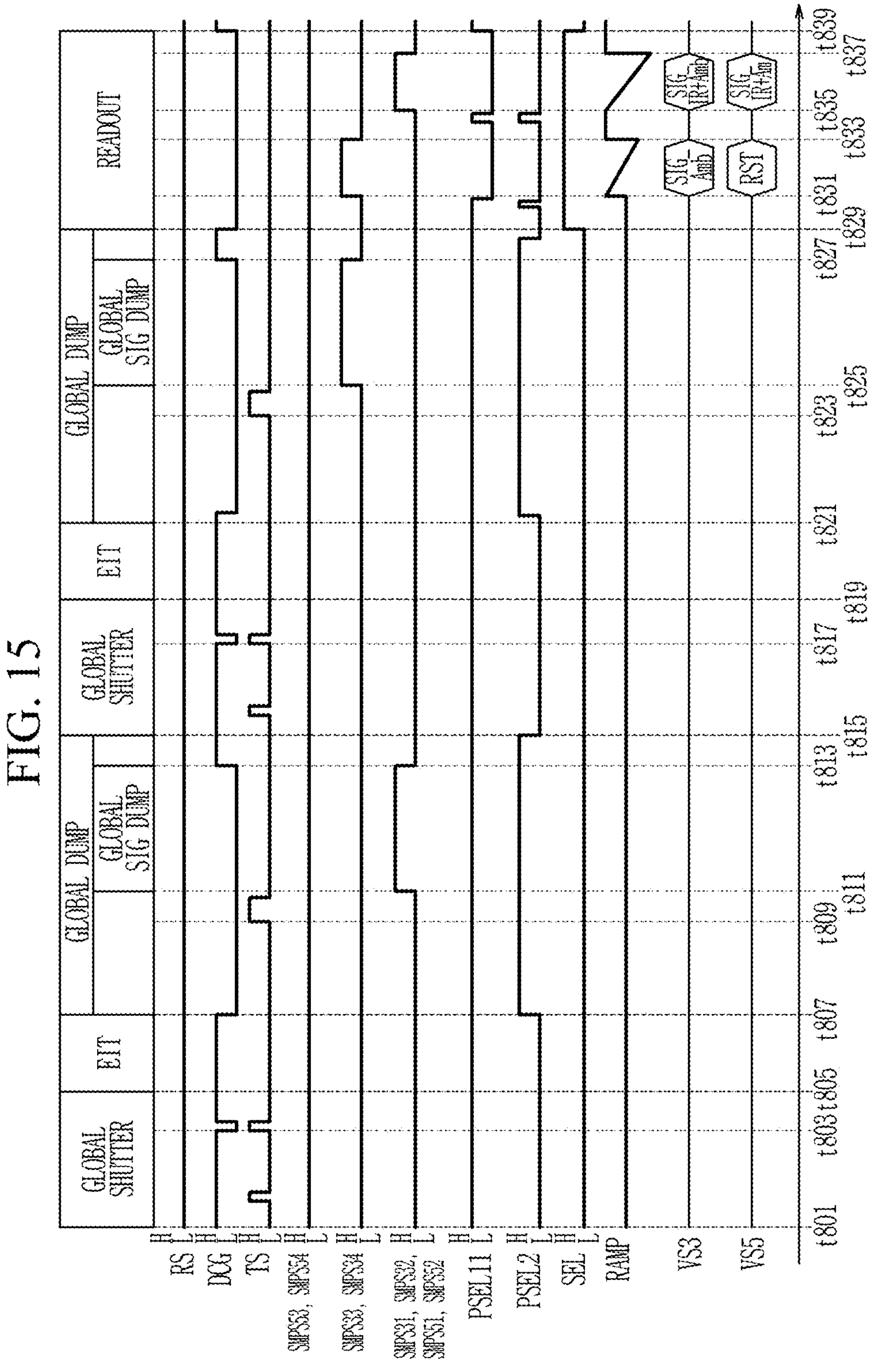
FIG. 15 is a timing diagram illustrating an operation of an image sensor according to an embodiment.

FIG. 15 is a timing diagram illustrating an operation of an image sensor according to an embodiment.

For example, FIG. 15 is a timing diagram illustrating an operation of an image sensor 100 including an active pixel according to the pixel 1000 of FIG. 9 and a dummy pixel according to the pixel 1400 of FIG. 13. Also, FIG. 15 is a timing diagram illustrating an operation when the image sensor 100 operates in the ASM.

A first sampling control signal SMPS31, a second sampling control signal SMPS32, a first sampling control signal SMPS51, and a second sampling control signal SMPS52 may be identical.

A first global shutter section (GLOBAL SHUTTER) (from a time point t801 to a time point t805), a first effective integration time (EIT) section (from the time point t805 to a time point t807), a first global signal dumping section (GLOBAL SIGNAL DUMP) (from the time point t807 to a time point t815), a second global shutter section (GLOBAL SHUTTER) (from the time point t815 to a time point t819), a second effective integration time (EIT) section (from the time point t819 to a time point t821), a second global signal dumping section (GLOBAL SIGNAL DUMP) (from the time point t821 to a time point t829), and a readout section (READOUT) (from the time point t829 to a time point t839) may be similar to the first global shutter section (GLOBAL SHUTTER) (from the time point t601 to the time point t605), the first effective integration time (EIT) section (from the time point t605 to the time point t607), the first global signal dumping section (GLOBAL SIGNAL DUMP) (from the time point t607 to the time point t615), the second global shutter section (GLOBAL SHUTTER) (from the time point t615 to the time point t619), the second effective integration time (EIT) section (from the time point t619 to the time point t621), the second global signal dumping section (GLOBAL SIGNAL DUMP) (from the time point t621 to the time point t629), and the readout section (READOUT) (from the time point t629 to the time point t639) shown in FIG. 12.

However, in the first global shutter section (from the time point t801 to the time point t805) to the readout section (from the time point t829 to the time point t839), a third sampling control signal SMPS53 and a fourth sampling control signal SMPS54 that are applied to the dummy pixel may be maintained at low levels L. When the third sampling control signal SMPS53 and the fourth sampling control signal SMPS54 are at the low levels L, the third sampling transistor SMP53 and the fourth sampling transistor SMP54 may be turned off.

Therefore, in the second global signal dumping section (from the time point t821 to the time point t829), the charge of a first output node NO51 cannot be sampled by a third capacitor C53 and a fourth capacitor C54. In the readout section (from the time point t829 to the time point t839), the pixel 1400 may output a signal RST corresponding to the charge of the first output node NO51, as a pixel signal VS5, through a column line CL.

The readout circuit 150 may perform a correlated double sampling operation based on the result of the comparison between the image signal SIG_Amb of the pixel signal VS3 received from the pixel 1000 and the ramp signal RAMP and the result of the comparison between the image signal SIG_IR_Amb and the ramp signal RAMP. Accordingly, the image sensor 100 may generate an image output signal IMS from which noise caused by the ambient light has been removed.

Also, the readout circuit 150 may perform a correlated double sampling operation based on the result of the comparison between the signal RST of the pixel signal VS5 received from the pixel 1400 and the ramp signal RAMP and the result of the comparison between the image signal SIG_IR+Amb and the ramp signal RAMP. The readout circuit 150 may generate a mode data signal MDS based on the difference between the signal RST and the image signal SIG_IR+Amb. For example, the readout circuit 150 may generate a mode data signal MDS based on the result of the comparison between the signal RST and the ramp signal RAMP and the result of the comparison between the image signal SIG_IR+Amb and the ramp signal RAMP.

Figure 16:
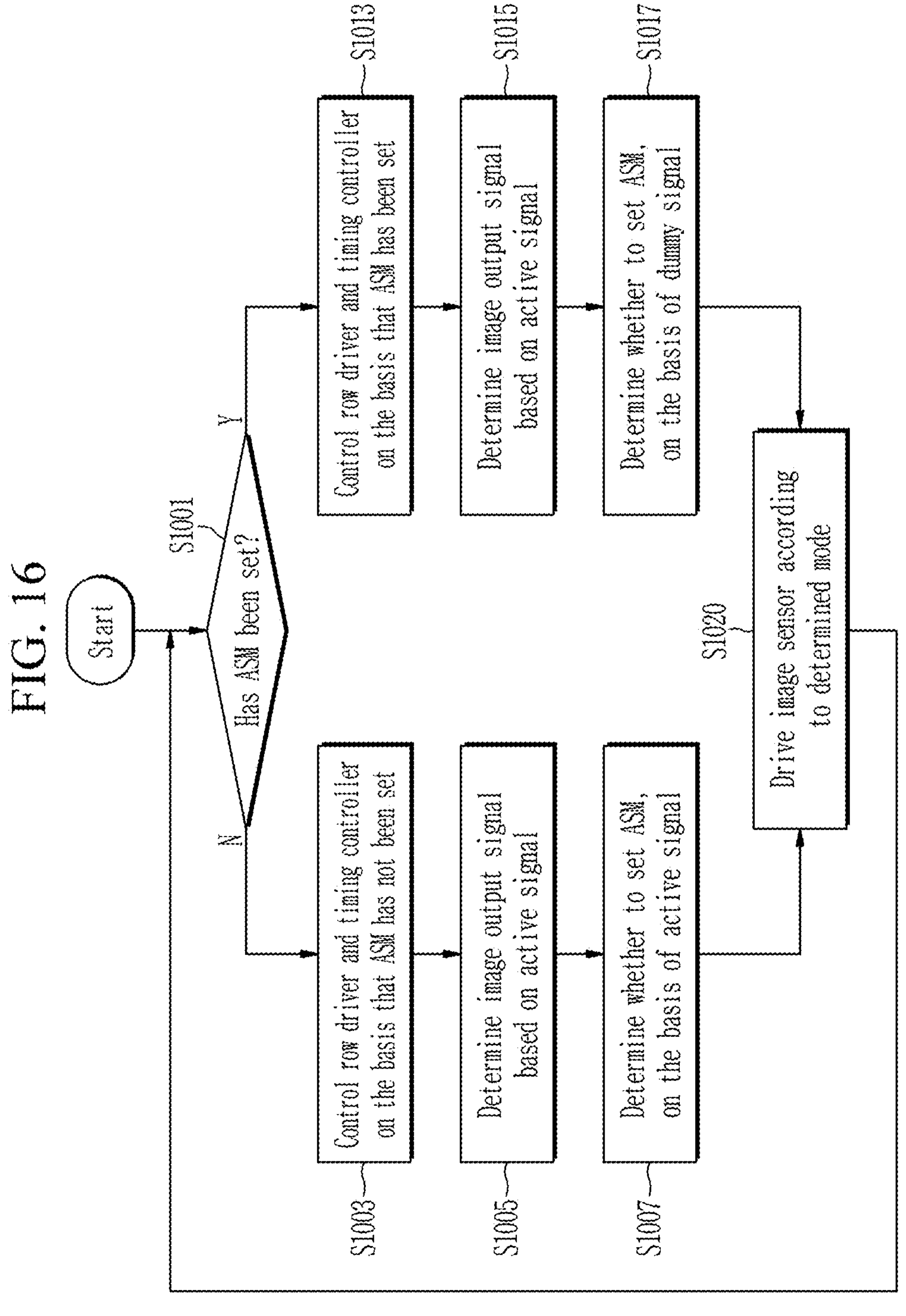
FIG. 16 is a flowchart illustrating an operation of the image sensor according to an embodiment.

FIG. 16 is a flowchart illustrating an operation of the image sensor according to an embodiment.

First, the controller 110 determines whether the ASM has been set (operation S1001).

When determining that the ASM has not been set, the controller 110 controls the row driver 130 and the timing controller 120 on the basis that the ASM has not been set (operation S1003).

For example, the controller 110 may control the row driver 130 and the timing controller 120 such that the pixel array 240 performs a shutter operation, a global dumping operation, and a readout operation. For example, the controller 110 may control the pixel array 240 such that a reset voltage related to the ambient light and the light source and an image voltage related to the ambient light and the light source are sampled by individual capacitors inside the pixel array 240, respectively.

The readout circuit 150 determines an image output signal IMS based on an active signal output from the pixel array 240 (operation S1005).

For example, the readout circuit 150 may determine an image output signal IMS based on a reset signals and an image signal output from the active pixels. Here, the image output signal IMS may be transmitted to the image signal processor 180.

Meanwhile, the readout circuit 150 may generate a mode data signal MDS based on a dummy signal. The mode data signal MDS may include the intensity of the image signal related to the ambient light and the light source.

The controller 110 may determine whether to set the ASM based on the dummy signal (operation S1007).

For example, the controller 110 may receive the mode data signal MDS from the readout circuit 150 and determine whether to set the ASM based on the mode data signal MDS.

The controller 110 may determine whether to set the ASM based on the magnitude of the image signal output from the dummy pixels. For example, when the magnitude of the image signal is larger than a preset threshold value, the controller 110 may determine to set the ASM. In some embodiments, the controller 110 may determine to set the ASM when the length of a first period when the magnitude of the image signal is larger than a preset first threshold value is longer than a preset period. In other words, if the magnitude of the image signal is larger than the first threshold value for the first period, the controller 110 may determine to set the ASM, only when the frame period becomes longer than the preset period.

Thereafter, the controller 110 drives the image sensor according to the determined mode (operation S1020).

When the controller 110 determines to set the ASM in STEP S1007, the controller 110 may control the row driver 130 and the timing controller 120 on the basis that the ASM is set.

When determining that the ASM has been set, the controller 110 controls the row driver 130 and the timing controller 120 on the basis that the ASM has been set (operation S1013).

For example, the controller 110 may control the row driver 130 and the timing controller 120 such that the pixel array 240 performs at least two shutter operations, at least two global dumping operations, and a readout operation. For example, the controller 110 may control the pixel array 240 such that an image voltage related to the ambient light and an image voltage related to the ambient light and the light source are sampled by individual capacitors inside the pixel array 240, respectively. Here, by way of the dummy pixel, only an image voltage related to the ambient light and the light source may be sampled.

The controller 110 determines an image output signal IMS based on the active signal (operation S1015).

For example, the controller 110 may determine an image output signal IMS based on the image signal related to the ambient light and the image signal related to the ambient light and the light source, output from the active pixels.

Thereafter, the controller 110 determines whether to set the ASM based on the dummy signal (operation S1017).

For example, the readout circuit 150 may generate a mode data signal MDS based on the active signal. The controller 110 may receive the mode data signal MDS from the readout circuit 150, and determine whether to set the ASM based on the mode data signal MDS.

The controller 110 may determine whether to set the ASM based on the image signal related to the ambient light and the light source, output from the dummy pixel. For example, when the magnitude of the image signal is smaller than a preset magnitude, the controller 110 may determine to release the ASM. In some embodiments, the controller 110 may determine to release the ASM, if the magnitude of the image signal becomes smaller than a preset second threshold value at least twice. The controller 110 may determine to release the ASM when the length of a first period, during which the magnitude of the image signal is smaller than the preset second threshold value, is longer than a preset period. In other words, if the magnitude of the image signal is smaller than the second threshold value for the first period, the controller 110 may determine to release the ASM only when the first period becomes longer than the preset period.

Thereafter, the controller 110 drives the image sensor according to the determined mode (operation S1020).

When the controller 110 determines to release the ASM in STEP S1007, the controller 110 may control the row driver 130 and the timing controller 120 on the basis that the ASM is released.

Figure 17:
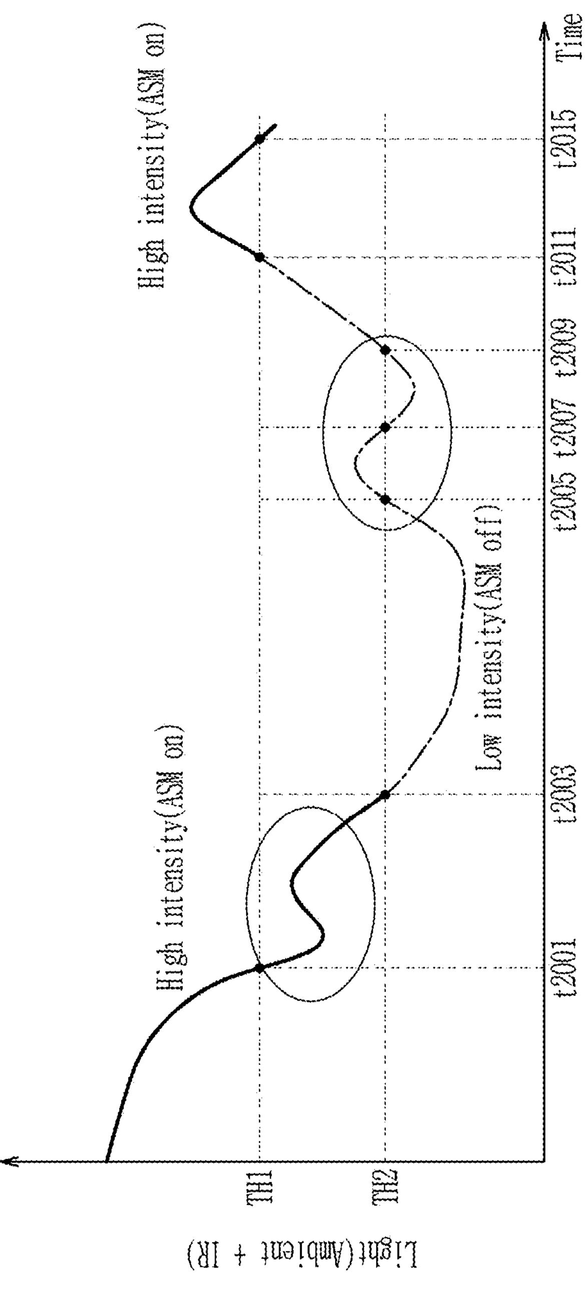
FIG. 17 is a graph illustrating the intensity of a light source and ambient light over time.

FIG. 17 is a graph illustrating the intensity of a light source and ambient light over time.

Since the intensity of the light source 13 is constant, FIG. 17 is a graph illustrating when the intensity of ambient light varies.

The controller 110 may set two threshold values having different values. In some embodiments, when the intensity of the image signal becomes smaller than a first threshold value TH1 and then becomes smaller than a second threshold value TH2, the controller 110 may determine that the intensity of the ambient light has become smaller, and release the ASM. In some embodiments, when the intensity of the image signal becomes larger than the second threshold value TH2 and then becomes larger than the first threshold value TH1, the controller 110 may determine that the intensity of the ambient light is large, and set the ASM.

First, at a time point t2001, the intensity of the image signal may become smaller than the first threshold value TH1. Thereafter, the intensity of the image signal may vary between the first threshold value TH1 and the second threshold value TH2 until a time point t2003. At the time point t2003, the intensity of the image signal may become smaller than the second threshold value TH2.

Since the intensity of the image signal has become smaller than the first threshold value and then smaller than the second threshold value TH2, the controller 110 may release the ASM.

At a time point t2005, the intensity of the image signal may become larger than the second threshold value TH2. Thereafter, at a time point t2007, the intensity of the image signal may become smaller than the second threshold value TH2. At a time point t2009, the intensity of the image signal may become larger than the second threshold value TH2.

For a period from the intensity of the image signal becomes the second threshold value TH2 for the first time, the intensity of the image signal may repeatedly become larger than and smaller than the second threshold value TH2. Accordingly, the controller 110 may maintain the ASM unset.

At a time point t2011, the intensity of the image signal may become larger than the first threshold value TH1.

Since the intensity of the image signal has become larger than the first threshold value TH1 after becoming larger than the second threshold value TH2, the controller 110 may set the ASM.

Thereafter, at a time point t2015, the intensity of the image signal may become smaller than the first threshold value TH1.

Accordingly, the image sensor 100 may determine whether to set the ASM in a situation where the intensity of the ambient light frequently varies. For example, the image sensor 100 may prevent the ASM from being frequently set and released when the vehicle passes through tunnels or through the shadows of buildings.

Figure 18:
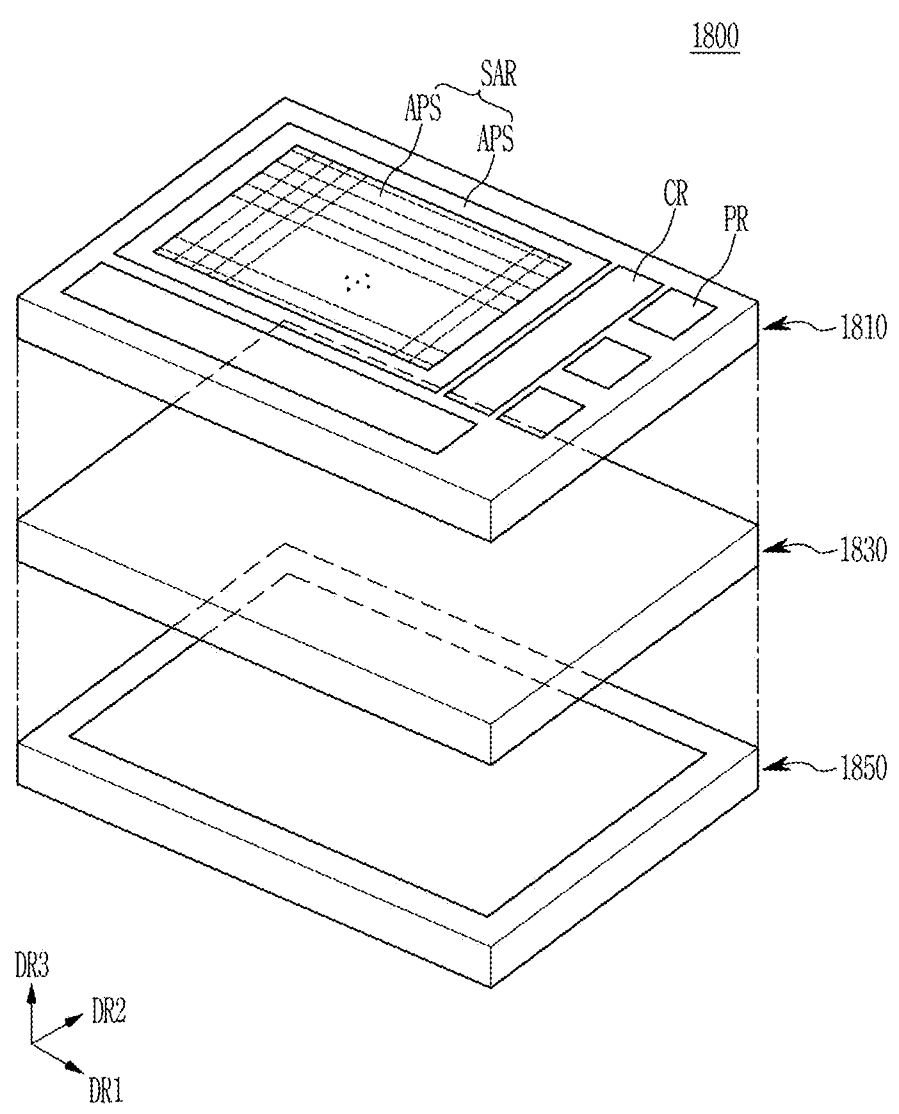
FIG. 18 is a drawing illustrating the conceptual layout of an image sensor according to an embodiment.

FIG. 18 is a drawing illustrating the conceptual layout of an image sensor according to an embodiment.

As shown in FIG. 18, an image sensor 1800 may be a 3-layer stacked image sensor including three layers 1810, 1830, and 1850. The image sensor 100 may include the first layer 1810, a second layer 1830, and a third layer 1850. In some embodiments, the image sensor 1800 may include the first layer 1810, the second layer 1830, and the third layer 1850 stacked. The first layer 1810, the second layer 1830, and the third layer 1850 may be stacked in the third direction DR3. However, embodiments of the present disclosure are not limited thereto. For example, in some embodiments, the first layer 1810, the second layer 1830, and the third layer 530 may be formed as one layer.

In some embodiments, the first layer 1810 may include photoelectric elements PD and transfer transistors TX of a pixel array 240, and the second layer 1830 may include the other transistors of the pixel array 240 (for example, the transistors RX, DCX, SF1, PCX, PSX2, SMP11, and SMP12 shown in FIG. 3, and the like). For example, referring to FIG. 3, the photoelectric element PD and the transfer transistor TX may be disposed in the first layer 1810, and the other transistors may be disposed in the second layer 1830.

In some embodiments, the third layer 1850 may include the other constituent elements of the image sensor 100. For example, referring to FIG. 1, the third layer 1850 may include a controller 110, a timing controller 120, a row driver 130, a pixel array 140, a readout circuit 150, a ramp signal generator 160, a data buffer 170, and an image signal processor 180. The third layer 1850 may receive signals from the first layer 1810 and the second layer 1830, and process the signals.

Figure 19:
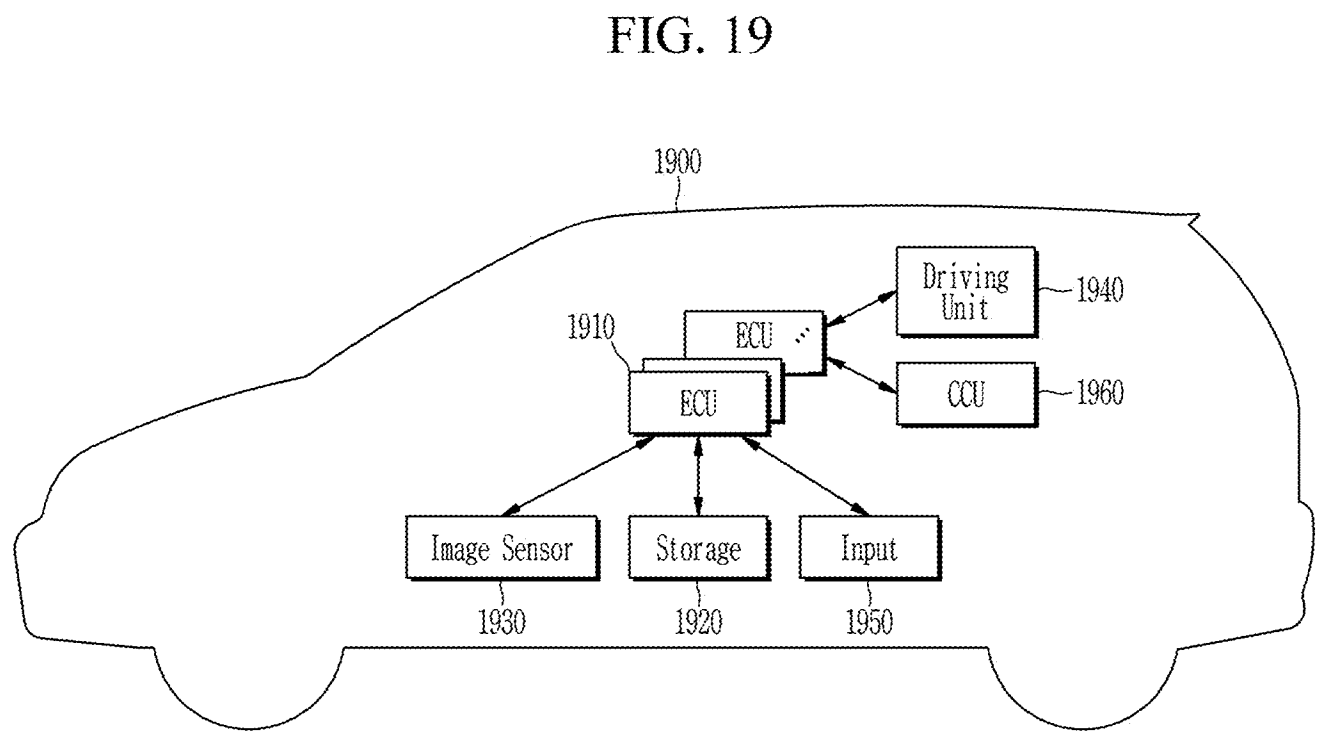

FIG. 19 is a drawing illustrating a vehicle including an image sensor according to an embodiment.

Referring to FIG. 19, a vehicle 1900 may include a plurality of electronic control units (ECUs) 1910 and a storage device 1920.

Each electronic control unit of the plurality of electronic control units 1910 may be electrically, mechanically, and communicatively connected to at least one device of a plurality of devices provided in the vehicle 1900, and control the operation of at least one device based on any one function performance instruction.

Here, the plurality of devices may include an image sensor 1930 that obtains an image utilized to perform at least one function, and a driving unit 1940 that performs at least one function.

For example, the image sensor 1930 may include the image sensor 100 described with reference to FIGS. 1 to 18. The image sensor 1930 may correspond to an automotive image sensor. The image sensor 1930 may determine whether to set the ASM on the basis of the intensity of ambient light.

For example, the image sensor 1930 may determine whether to set the ASM by comparing the intensity of the ambient light with a preset threshold value. For example, the image sensor 1930 may set the ASM when the intensity of the ambient light is larger than a first threshold value. The image sensor 1930 may release the ASM when the intensity of the ambient light is smaller than a second threshold value.

In some embodiments, the image sensor 1930 may determine whether to set the ASM using at least two threshold values. For example, the image sensor 1930 may set the ASM using a first threshold value and a second threshold value smaller than the first threshold value. When the intensity of the ambient light becomes larger than the first threshold value and the second threshold value within a predetermined period from when it begins to increase from a value smaller than the second threshold value, the image sensor 1930 may set the ASM. When the intensity of the ambient light becomes smaller than the first threshold value and the second threshold value within a predetermined period from when it begins to decrease from a value larger than the first threshold value, the image sensor 1930 may release the ASM.

Accordingly, the image sensor 1930 according to an embodiment may be capable of image sensing with increased reliability. For example, when the intensity of the ambient light is low, the image sensor 1930 may generate an image output signal IMS that has a high frame rate including low noise without setting the ASM. When the intensity of the ambient light is high, the image sensor 1930 may operate in the ASM. The image sensor 1930 may determine whether to the ASM on the basis of the intensity of ambient light, even if the image sensor does not include a separate sensor for sensing ambient light.

The driving unit 1940 may include, for example, a fan and compressor of an air conditioner, a fan of a ventilation system, an engine and motor of the power system, a motor and valve of a braking system, an opening/closing system of a door or a tailgate, etc.

The plurality of electronic control units 1910 may perform communication with the image sensor 1930 and the driving unit 1940, for example, using at least one of Ethernet communication, low-voltage differential signaling (LVDS) communication, and local interconnect network (LIN) communication.

The plurality of electronic control units 1910 may determine whether it is necessary to perform a function based on information obtained through the image sensor 1930. When determining that it is necessary to perform a function, the plurality of electronic control units 1910 may control the operation of the driving unit 1940 and control the amount of operation based on the obtained information. At this time, the plurality of electronic control units 1910 may store obtained images in the storage device 1920, or may read information stored in the storage device 1920 and use them.

The plurality of electronic control units 1910 may also be able to control the operation of the driving unit 1940 to perform the corresponding function based on a function performance instruction input through an input unit 1950, and be able to check a setting amount corresponding to information input through the input unit 1950 and control the operation of the driving unit 1940 to perform the corresponding function based on the checked setting amount.

Each electronic control unit 1910 may independently control any one function, or may control any one function in conjunction with other electronic control units. For example, an electronic control unit of a collision avoidance system may control a speaker to output a warning sound about a collision with an obstacle when the distance to the obstacle detected through a distance detector is within a reference distance.

An electronic control unit of an autonomous driving controller may perform autonomous driving by receiving, for example, navigation information, road image information, and information on the distances to obstacles, and controlling the power system, the braking system, and the steering system in conjunction with an electronic control unit of a terminal for the vehicle, an electronic control unit of an image acquiring unit, and the electronic control unit of the collision avoidance system.

A connectivity control unit (CCU) 1960 is electrically, mechanically, and communicatively connected to each of the plurality of electronic control units 1910, and performs communication with each of the plurality of electronic control units 1910.

In other words, the connectivity control unit 1960 may also perform direct communication with the plurality of electronic control units 1910 provided inside the vehicle, may also perform communication with an external server, and may also perform communication with an external terminal through an interface.

Here, the connectivity control unit 1960 may perform communication with the plurality of electronic control units 1910, and may perform communication with a server, using an antenna and RF communication. Further, the connectivity control unit 1960 may perform communication with a server via wireless communication. Wireless communication between the connectivity control unit 1960 and the server is possible through various wireless communication methods including, for example, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, a Wi-Fi module, and a wireless WiBro module.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims

What is claimed is:

1. An image sensor, comprising:

a pixel array including an active pixel configured to generate an active signal based on first light received from a light source, and a dummy pixel configured to generate a dummy signal based on the first light;

a readout circuit configured to generate an image output signal based on the active signal output from the active pixel, and generate a mode data signal related to ambient light entering the pixel array based on the dummy signal output from the dummy pixel; and a controller configured to determine whether to set an ambient light subtraction mode based on the mode data signal, and control the pixel array based on whether the ambient light subtraction mode has been set.

2. The image sensor of claim 1, wherein the active pixel includes:

a first photoelectric element;

a first floating diffusion node configured to accumulate a first photoelectric charge generated by the first photoelectric element;

a first capacitor configured to store a first charge based on a voltage of the first floating diffusion node;

a second capacitor configured to store a second charge based on the voltage of the first floating diffusion node;

a first sampling transistor connected to a first output node and configured to sample the first charge stored in the first capacitor;

a second sampling transistor connected to the first output node and configured to sample the second charge stored in the second capacitor; and a first drive transistor configured to amplify a voltage of the first output node and output the amplified voltage as the active signal.

3. The image sensor of claim 2, wherein the dummy pixel includes:

a second photoelectric element;

a second floating diffusion node configured to accumulate a second photoelectric charge generated by the second photoelectric element;

a third capacitor configured to store a third charge based on a voltage of the second floating diffusion node;

a fourth capacitor configured to store a fourth charge based on the voltage of the second floating diffusion node;

a third sampling transistor connected to a second output node and configured to sample the third charge stored in the third capacitor;

a fourth sampling transistor having one end connected to the fourth capacitor and a second end that is floating; and a second drive transistor configured to amplify a voltage of the second output node and output the amplified voltage as the dummy signal.

4. The image sensor of claim 3, wherein in response to the ambient light subtraction mode being set, the controller is configured to control the pixel array to perform a first shutter operation of generating a third photoelectric charge based on the first light and the ambient light in a state where the light source is on, and a second shutter operation of generating a fourth photoelectric charge based on the ambient light in a state where the light source is off.

5. The image sensor of claim 4, wherein in response to the ambient light subtraction mode being set, the first capacitor is configured to store the first charge according to a voltage corresponding to the third photoelectric charge, and the second capacitor is configured to store the second charge according to a voltage corresponding to the fourth photoelectric charge.

6. The image sensor of claim 5, wherein in response to the ambient light subtraction mode being set, the third capacitor is configured to store the third charge according to a voltage corresponding to the second output node, which has been reset, and the fourth capacitor is configured to store the fourth charge according to a voltage corresponding to the fourth photoelectric charge generated by the second shutter operation.

7. The image sensor of claim 3, wherein in response to the ambient light subtraction mode not being set, the controller is configured to control the pixel array to perform a shutter operation of generating a third photoelectric charge based on the first light and the ambient light in a state where the light source is on.

8. The image sensor of claim 7, wherein in response to the image sensor operating without setting the ambient light subtraction mode, the first capacitor is configured to store the first charge according to the voltage of the first floating diffusion node, which has been reset, the second capacitor is configured to store the second charge according to a voltage corresponding to the third photoelectric charge, the third capacitor is configured to store the third charge according to the voltage of the second output node, which has been reset, and the fourth capacitor is configured to store the fourth charge according to a voltage corresponding to the third photoelectric charge generated by the shutter operation.

9. The image sensor of claim 1, wherein:

the controller is configured to set a first threshold value and a second threshold value smaller than the first threshold value based on an intensity of the first light, and determine to set the ambient light subtraction mode in response to an intensity of the ambient light varying from a first value smaller than the second threshold value to a second value larger than the first threshold value.

10. The image sensor of claim 9, wherein:

the controller is configured to set a first threshold value and a second threshold value smaller than the first threshold value based on an intensity of the first light, and determine to release the ambient light subtraction mode in response to an intensity of the ambient light varying from a first value larger than the first threshold value to a second value smaller than the second threshold value.

11. A driving method of an image sensor, the method comprising:

receiving, by an image sensor including an active pixel and a dummy pixel, incident light for a first frame;

generating, by the active pixel, an active signal based on the incident light;

generating an image output signal based on the active signal;

determining whether to set an ambient light subtraction mode, with respect to a next frame subsequent to the first frame, based on a dummy signal generated by a dummy pixel, wherein the ambient light subtraction mode removes noise caused by ambient light of the incident light; and driving the image sensor according to whether the ambient light subtraction mode has been set.

12. The driving method of claim 11, wherein the active pixel includes:

a first photoelectric element;

a first floating diffusion node configured to accumulate a first photoelectric charge generated by the first photoelectric element;

a first capacitor configured to store a first charge based on a voltage of the first floating diffusion node;

a second capacitor configured to store a second charge based on the voltage of the first floating diffusion node;

a first sampling transistor connected to a first output node and configured to sample the first charge stored in the first capacitor;

a second sampling transistor connected to the first output node and configured to sample the second charge stored in the second capacitor; and a first drive transistor configured to amplify a voltage of the first output node and output the amplified voltage as the active signal; and the first dummy pixel includes:

a second photoelectric element;

a second floating diffusion node configured to accumulate a second photoelectric charge generated by the second photoelectric element;

a third capacitor configured to store a third charge based on a voltage of the second floating diffusion node;

a fourth capacitor configured to store a fourth charge based on the voltage of the second floating diffusion node;

a third sampling transistor connected to a second output node and configured to sample the third charge stored in the third capacitor;

a fourth sampling transistor having one end connected to the fourth capacitor and a second end that is floating; and a second drive transistor configured to amplify a voltage of the second output node and output the amplified voltage as the dummy signal.

13. The driving method of claim 12, wherein driving the image sensor when the ambient light subtraction mode has been set includes:

turning on a light source and performing a first shutter operation of generating a third photoelectric charge based on the incident light;

turning off the light source and performing a second shutter operation of generating a fourth photoelectric charge based on the ambient light;

performing a first global dumping operation of sampling the third photoelectric charge;

performing a second global dumping operation of sampling the fourth photoelectric charge; and reading out the third photoelectric charge and the fourth photoelectric charge.

14. The driving method of claim 13, wherein performing the first global dumping operation includes sampling the third photoelectric charge according to a voltage corresponding to the first charge stored in the first capacitor; and performing the second global dumping operation includes sampling the fourth photoelectric charge according to a voltage corresponding to the second charge stored in the second capacitor and according to a voltage corresponding to the fourth charge stored in the fourth capacitor.

15. The driving method of claim 14, wherein reading out the third photoelectric charge and the fourth photoelectric charge includes:

reading out the first charge stored in the first capacitor through the first drive transistor;

reading out the second charge stored in the second capacitor through the first drive transistor;

reading out the third charge according to a voltage corresponding to the second output node, which is reset, through the second drive transistor; and reading out the fourth charge stored in the fourth capacitor through the second drive transistor.

16. The driving method of claim 12, wherein driving the image sensor when the ambient light subtraction mode has not been set includes:

turning on a light source and performing a shutter operation of generating a fourth photoelectric charge based on the light source and the ambient light;

performing a third global dumping operation of sampling the fourth photoelectric charge; and reading out the fourth photoelectric charge.

17. The driving method of claim 16, wherein performing the third global dumping operation includes:

sampling the first charge according to a voltage to which the first floating diffusion node has been reset in the first capacitor;

sampling the second charge according to a voltage corresponding to the fourth photoelectric charge in the second capacitor; and sampling the fourth charge according to a voltage corresponding to the fourth photoelectric charge in the fourth capacitor.

18. The driving method of claim 17, wherein reading out the fourth photoelectric charge includes:

reading out the first charge sampled in the first capacitor through the first drive transistor;

reading out the second charge sampled in the second capacitor through the first drive transistor;

reading out the third charge according to a voltage corresponding to the reset second output node through the second drive transistor; and reading out the fourth charge sampled in the fourth capacitor through the second drive transistor.

19. The driving method of claim 11, wherein determining whether to set the ambient light subtraction mode includes:

setting a first threshold value and a second threshold value smaller than the first threshold value based on an intensity of the incident light; and determining to set the ambient light subtraction mode when an intensity of the ambient light varies from a first value smaller than the second threshold value to a second value larger than the first threshold value.

20. A sensor system, comprising:

a light source; and an image sensor configured to receive incident light including light output from the light source and ambient light, wherein the image sensor includes:

an active pixel configured to generate an active signal based on the incident light; and a dummy pixel configured to generate a dummy signal based on the incident light, wherein the image sensor is further configured to generate an image output signal based on the active signal, and determine whether to set an ambient light subtraction mode in which noise generated by the ambient light is removed from the image output signal, and generate a light source control signal that controls the light source, based on whether the ambient light subtraction mode has been set.

* * * * *